(12) United States Patent
Mays

(10) Patent No.: US 8,321,126 B2
(45) Date of Patent: *Nov. 27, 2012

(54) DEVICES, METHODS, AND SYSTEMS FOR MANAGING ROUTE-RELATED INFORMATION

(76) Inventor: Michael Mays, Mount Solon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/877,196

(22) Filed: Sep. 8, 2010

(65) Prior Publication Data

US 2011/0010241 A1      Jan. 13, 2011

Related U.S. Application Data

(63) Continuation of application No. 11/540,067, filed on Sep. 29, 2006, now Pat. No. 7,865,306, which is a continuation-in-part of application No. 10/390,838, filed on Mar. 18, 2003, which is a continuation-in-part of application No. PCT/US01/27735, filed on Sep. 27, 2001, which is a continuation-in-part of application No. 09/671,271, filed on Sep. 28, 2000, now Pat. No. 6,351,710.

(60) Provisional application No. 60/722,135, filed on Sep. 30, 2005.

(51) Int. Cl.
G01C 21/34 (2006.01)

(52) U.S. Cl. ........ 701/428; 348/148; 348/153; 725/105; 340/995.19

(58) Field of Classification Search .................. 701/211, 701/428; 340/995.19; 348/148, 153; 725/105
See application file for complete search history.

(56) References Cited

U.S. PATENT DOCUMENTS

| | | | | |
|---|---|---|---|---|
| 5,396,431 A * | 3/1995 | Shimizu et al. | ............... | 701/213 |
| 5,850,193 A * | 12/1998 | Shimoura et al. | .......... | 340/995.1 |
| 6,282,489 B1 * | 8/2001 | Bellesfield et al. | ........... | 701/533 |
| 6,525,768 B2 * | 2/2003 | Obradovich | ............ | 348/231.99 |
| 6,611,753 B1 * | 8/2003 | Millington | .................... | 701/436 |
| 6,983,203 B1 * | 1/2006 | Wako | ............................. | 701/208 |
| 7,133,837 B1 * | 11/2006 | Barnes, Jr. | ................. | 705/26.81 |

* cited by examiner

Primary Examiner — Tuan C. To
(74) Attorney, Agent, or Firm — Michael Haynes PLC; Michael N. Haynes

(57) ABSTRACT

A method can include, for a predetermined route, automatically processing a first set of machine instructions to create a visual travel guide for the predetermined route, the visual travel guide comprising a second set of machine instructions adapted to cause an information device to render: an identification of a destination of the predetermined route; a plurality of videos, each video corresponding to a road intersection located approximately on the predetermined route, each video adapted to substantially reproduce a view of a driver of an automobile approaching the road intersection; a plurality of textual descriptions associated with the plurality of videos; at least one of an identification of an origin of the predetermined route and an identification of an approach to the destination; and an advertisement associated with at least a portion of the predetermined route.

20 Claims, 22 Drawing Sheets

FIG. 11

Main Street Inn

HOTEL DISPLAY
44 East Main Street
Staunton, VA 24401
(540) 222-2222 (phone)
(540) 222-2345 (fax)

Breakfast Dinning Room 103W

Enjoy our complimentary breakfast of eggs, bacon, toast.

Single Bed with Dinnett – Room 132

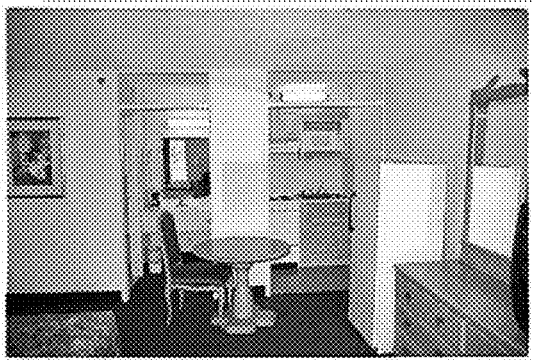

Ask about our tour groups that leave daily at 11:00 a.m. from the front main lobby.

Double Bed – Room 345

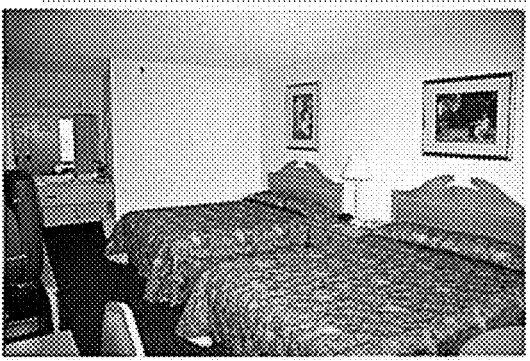

Room number 345. Ice machine is located on 2nd floor across from the elevator.

Exercise Room – Room 101N

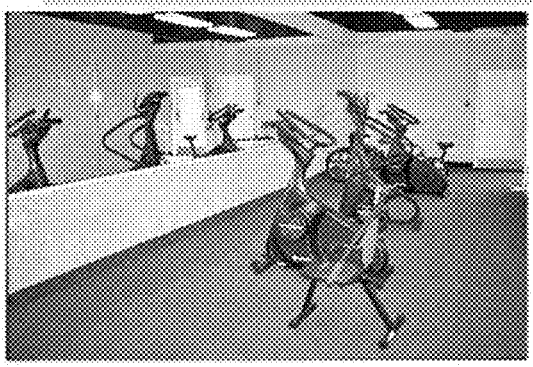

Please wipe bikes down with towels provided. Thank you for visiting us.

Single Queen Bed – Room 379

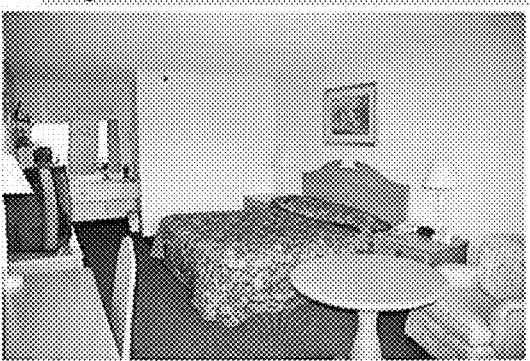

Be sure to ask about our room service and our new satellite system w/computer hook-up. Have a nice visit.

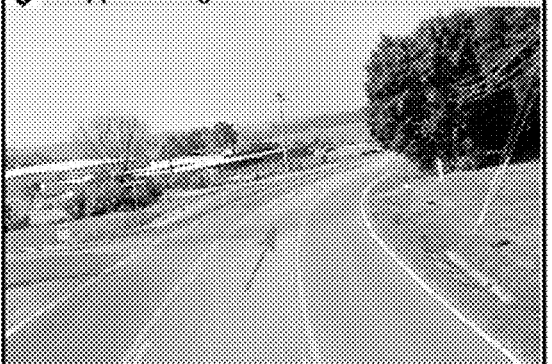
FIG. 18 A

20000

DEVICES, METHODS, AND SYSTEMS FOR MANAGING ROUTE-RELATED INFORMATION

This application is a Continuation of Non-Provisional U.S. patent application Ser. No. 11/540,067, filed 29 Sep. 2006, now U.S. Pat. No. 7,865,306 which incorporates by reference in its entirety, and claims the benefit of, Provisional U.S. Patent Application 60/722,135, filed 30 Sep. 2005, and is a Continuation-in-Part of, claims priority to, and incorporates by reference in its entirety, Non-Provisional U.S. patent application Ser. No. 10/390,838, filed 18 Mar. 2003, which is a Continuation-In-Part of, and claims priority to, International application PCT/US01/27735, filed 27 Sep. 2001, which is a Continuation of Non-Provisional U.S. application Ser. No. 09/671,271, filed 28 Sep. 2000, now U.S. Pat. No. 6,351,710, issued 26 Feb. 2002.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

In certain exemplary embodiments of a baseline method for providing visual guidance to a traveler, motorist, and/or end user, a series of way point photographs can be compiled into a static pictograph such that the physical arrangement of the individual photographs can provide the desired guidance. The arrangement can provide way points in natural driving order for ease of use. The pictographs can be hard copies provided as a single sheet, a fold-up brochure, and/or in booklet form regenerated from downloaded digital data. The photographs can be produced by physically traversing the routes between predetermined starting points and desired destinations, capturing scenes of selected way points using any of a variety of scene-capturing devices, while verifying and/or proving the validity, viability, and/or practicality of the route. These photographs then can be annotated, processed, stored, and/or subsequently retrieved as needed for delivery to an end user. In an advanced regional method for providing guidance between a plurality of starting points and a plurality of destinations—all within the boundaries of the region—a large number of way point photographs can be taken and compiled into a "city booklet." Thereafter, responsive to specific end-user requests detailing one or more starting points and/or one or more destinations, routes can be provided, and/or selected by joining paths of way points based on their locations, to produce a pictograph and/or a route listing. In either the point-to-point or regional approach, the end user can be guided by visually correlating the photographs of actual way points with superimposed directional arrows and descriptive text with the road actually being traveled as seen through the traveler's windshield and/or eyes.

Figure 1:
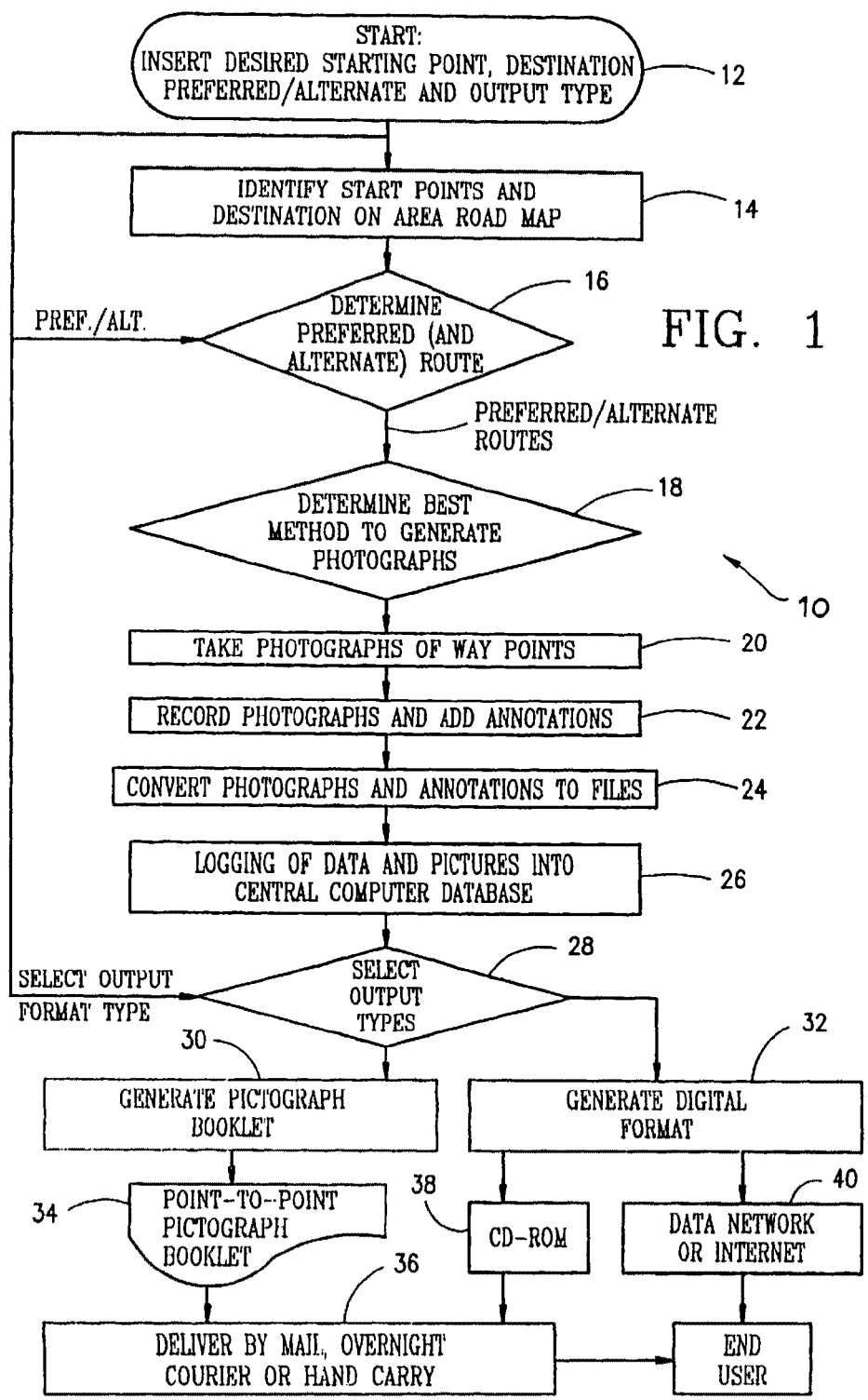
FIG. 1 is a flow chart detailing an exemplary baseline point-to-point embodiment of a visual addressing method.

Referring now to FIG. 1, there is shown a simplified flow chart outlining a baseline visual addressing method according to an exemplary embodiment. The baseline method 10 details the steps to implement a point-to-point embodiment used for guiding an end user from a single predetermined starting point to a single desired destination point. As used herein, the phrase "starting point" can include a specific geographical location (e.g., 123 East Main Street, the White House, etc.), a general location (e.g., south of Charlottesville, inside the I-495 Capitol Beltway, etc.), an approach (e.g., from Harrisonburg, I-81 South, US 29 north of Charlottesville, the inner loop of the I-495 Capitol Beltway, etc.), and/or a direction of travel (e.g. southward, northeasterly, etc.). In certain embodiments, starting points can be determined by a route developer. An end user and/or traveler can select a starting point from a set of starting points predetermined by the route developer.

Block 12 depicts the largely manual step of obtaining and entering the predetermined starting point, the desired destination, calling for a preferred and/or alternate route between them, and further designating the particular type of output desired (e.g., hard copy, downloadable file, screen display, etc.). In block 14 the inputs can be located on a road map of suitable scale, and a preferred and/or alternate route between the two can be determined in block 16 for eventual presentation to an end user and/or traveler. A preferred route typically can be determined by a priori knowledge of local road conditions, and other factors such as road construction, traffic flow, temporary hazards, and the like. Identification and/or selection of alternate routes can also be accomplished at block 16 for possible future use. Depending on the particular implementation employed, these method steps may be accomplished manually, via automated means, or more commonly using a combination of manual and automated means.

At block 18, the largely manual step of determining the best method for generating photographs of the way points can be accomplished. This can include selection of one or more photograph-capturing devices in accordance with the nature of the roads, traffic conditions, time of year, and the like. As used herein, way points may include starting points, destinations, main and/or secondary intersections, en route landmarks, turn locations and other end-user useful locations which call for a photograph. Standard photographic cameras, camcorders, digital cameras, plus variants of these and other devices are contemplated for use, with the 35 mm camera generally considered as the baseline photograph-capturing means. At block 20, the actual photograph-taking steps can be accomplished by physically traversing the preferred (and/or alternate) route(s) and capturing the images associated with the way point locations previously determined. On completion of the photographing, way point images can be recorded and/or annotated in block 22. These annotations may include a range of information types to be used for end-user purposes, for cataloging and for administrative requirements. Textual and/or graphic annotations can be added which will appear along with a particular photograph to provide standardized written directions and/or visual direction symbols to the end user. Cataloging annotations may include assigning way point physical location addressing, internal accession address codes, and/or date and time of capturing the photographs. Administrative annotations may include information on what type of image-capturing device produced the photograph as well as copyright notification, and the like. The results of this combining—images, directional information, text, addressing, etc.—can be converted in block 24 into one or more computer-readable files and/or stored for subsequent retrieval in a main computer database at block 26. The output of block 28 can be conditioned by a control input from block 12 to select the desired type of output format to be generated by blocks 30 and 32. Block 30 can generate a pictograph booklet 34 which may then be delivered to an end user by mail, overnight courier, and/or other type of physical delivery means 36. Block 32 can generate essentially the same content as in a pictograph, but in digital form, such as for producing a CD-ROM 38 for physical delivery, and/or for outputting and/or delivering to an end user via various networks 40, including the Internet, a virtual private network, a local area network, and/or a wide area network, etc.

Figure 2:
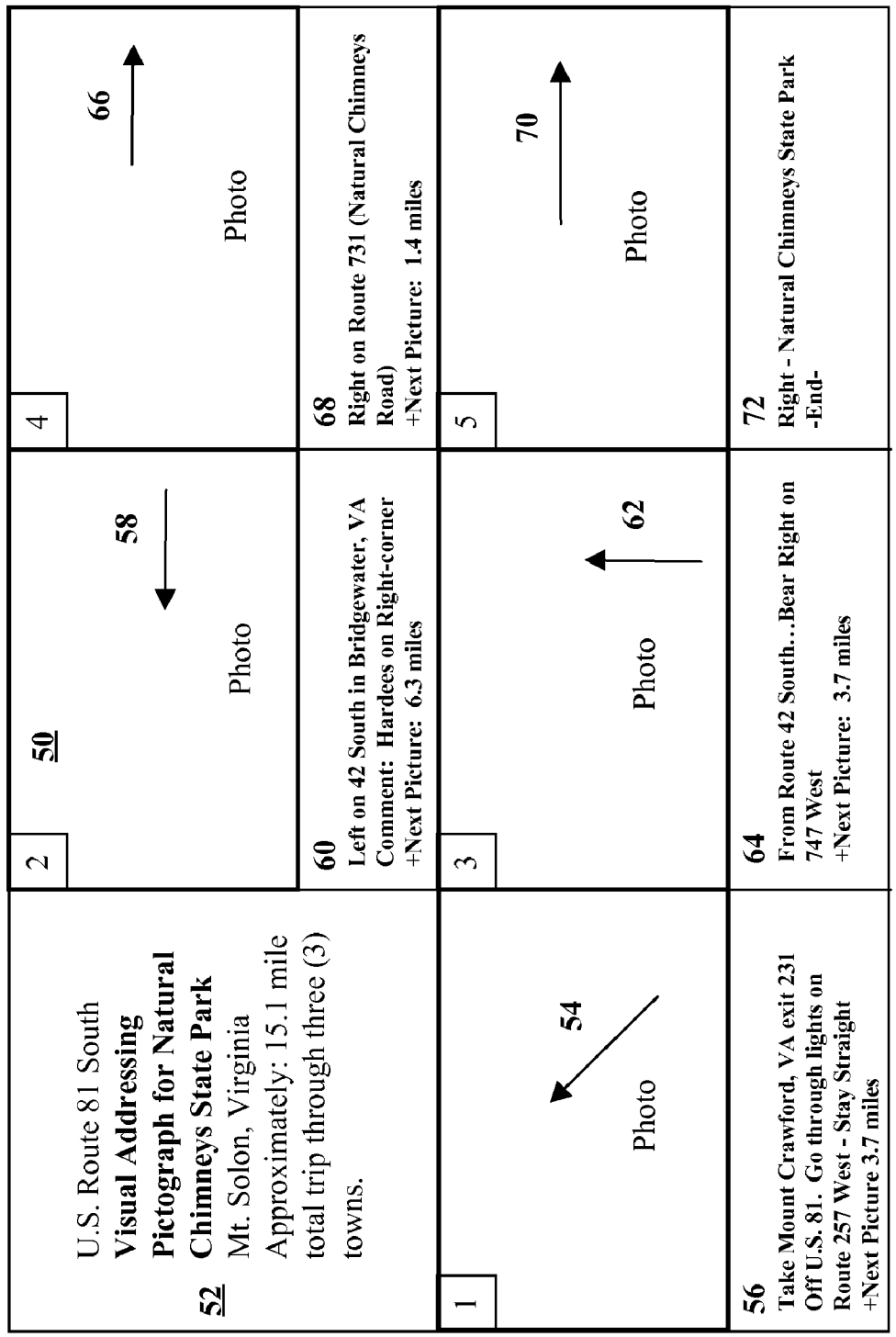
FIG. 2 is an exemplary pictograph produced via an exemplary embodiment of the method of FIG. 1 showing photographs of five way points directing an end user from a particular starting point to his/her desired destination.

A typical point-to-point pictograph is shown in FIG. 2 as five photographs arranged in a static sequence to guide an end user along a preferred route. A pictograph 50 can be provided as a hard copy sheet, brochure, folder and/or digital file for generating the equivalent thereof, providing visual addressing to, illustratively, the destination of National Chimneys State Park in Virginia, as indicated in a legend area 52, and includes annotated photographs numbered [1] through [5]. In photograph [1] we see the actual road scene that the driver/end user would encounter upon exiting interstate highway US 81 south at exit 231, his/her starting point. A superimposed arrow 54 indicates the path to be taken along the road shown, and the annotations in area 56 provide additional textual detail and guidance for the driver. Thereafter, photographs [2], [3] and [4] provide photographs of three additional way points in proper driving sequence or order, including directional arrows 58, 62 and 66 along with their corresponding textual annotation areas 60, 64 and 68. In the final photograph [5], the entrance to the desired destination is seen with a right turn directional arrow 70 denoting the path to the entrance, as described in the annotation area 72. As taught herein, arranging the way point photographs in driving order means that the photographs are physically arrayed, and/or may be numbered so as to be arrayed, in the same order as a driver properly following the route would naturally encounter the way point locations that the photographs represent.

Thus there has been described the baseline point-to-point visual addressing method, which can present en route travel information in a highly intuitive manner such that it can be immediately useable by a driver or end user without the need to learn or manipulate complex or confusing systems or devices. In a nutshell, a number of actual photographs can be produced and arranged in a natural and/or driving order sequence in hard copy form to guide a driver along a preferred route from a single predetermined starting point to a desired destination. Ideally, each way point photograph is taken and presented from a driver's eye view; at a designated distance and exposure so that the driver and/or end user can get familiar with the distance perception portrayed. Any pictograph, photograph, and/or any representation of a photograph can also be annotated, augmented, and/or associated with, for example, text (e.g., having standardized wordings), direction arrows, icons, dots, highlighting, and/or other symbols for focusing the traveler on a certain part and/or aspect of the route. For example, a red dot can appear "on" an interstate exit sign in a photo of an exit-sign-filled interchange to indicate the exit sign corresponding to the correct route. A digital version of the pictograph may also be produced and stored in a hard medium and/or outputted via a digital network for generating a hard copy form of the pictograph.

As used herein, the meaning of the term pictograph is accordingly expanded from its narrow dictionary definition to encompass a compilation of visual images in and/or producible in tangible form (i.e., hard copy), arranged in a particular sequence and/or manner so as to visually assist an end user in accomplishing a desired task. The images may include annotations such as graphics, text, and/or addressing. In certain exemplary embodiments, the task is that of aiding in the driving of a vehicle from a starting point to a desired destination unerringly, without the driver and/or other occupant having previously traveled the route. Note that the point-to-point method is not necessarily limited to just short trips and/or highly-localized areas. It is contemplated that a dozen or two carefully selected way points may be adequate to guide a motorist from the western end of the George Washington Bridge in New York City, down the New Jersey Turnpike to a destination in Baltimore just off I-695, the Baltimore Beltway.

Figure 3:
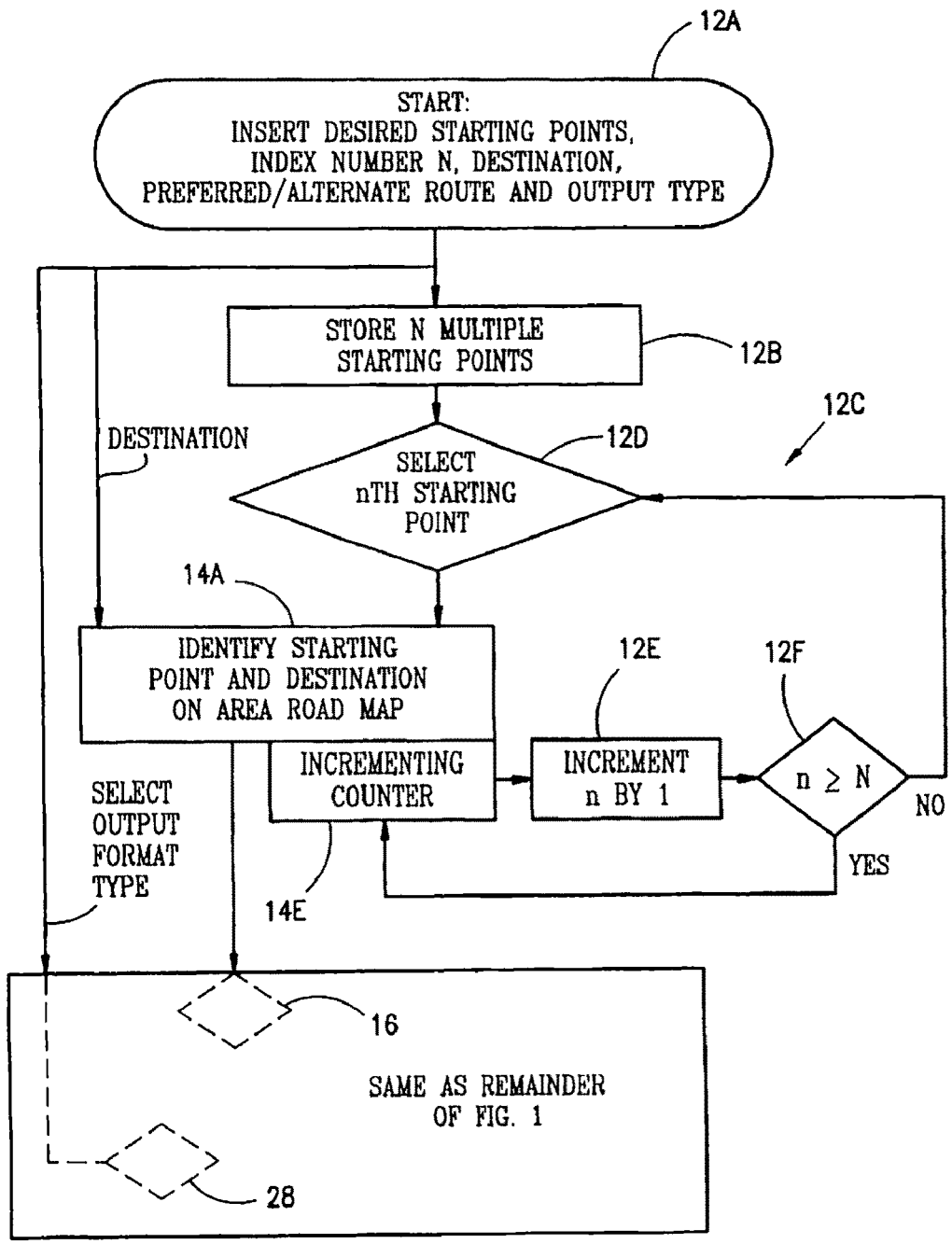
FIG. 3 is a partial flow chart showing an exemplary embodiment of the point-to-point visual addressing method of FIG. 1 whereby a number of different starting points are accommodated.

The above baseline embodiment is readily amenable to being of even greater usefulness in expanded embodiments. Consider first the commonly encountered need to guide a traveler to a given destination where the traveler may be approaching from any one of several different directions, which gives rise to the need for a multiple starting point capability. FIG. 3 shows a modification to the method of FIG. 1 to accomplish this. Whereas the pictograph of FIG. 2 shows a single starting point, single destination brochure, it might be more generally useful to provide a plurality of pictographs, each of which is devoted to a different starting point. These may include approaching the single destination from the north, south, east or west, as well as approaching from more than one interstate highway, and/or from other well-known roadways and/or intersections.

In the partial flow chart of FIG. 3, block 12A includes the additional capability of accepting multiple starting points and an index number N denoting how many of them are inputted. The N starting points are stored in block 12B for sequential use under the control of a counting loop 12C. On retrieval of the first (n=1) of N starting points by selection block 12D, the method proceeds substantially as described in connection with the FIG. 1 embodiment to produce a pictograph in the desired output type for the particular starting point selected. On completion of processing the first starting point in block 14A and thereafter, block 14A then increments counter 14E by one count causing the blocks 12E and 12F to select the next (n=2) starting point to be fully processed to produce another distinct pictograph. When the full N starting points have been processed, block 12F cuts off the incrementing counter 14E and the system becomes quiescent waiting for a new set of data to be loaded at block 12A. The N distinct pictographs thus produced may be provided as stand-alone hard copies, and/or they may be combined into one or more booklets and/or brochures. The digital output type, if selected, is similarly handled. Note that the blocks functionally below the modification of FIG. 3, namely blocks 16 and 28 and thereafter, operate identically as previously described.

Figure 4:
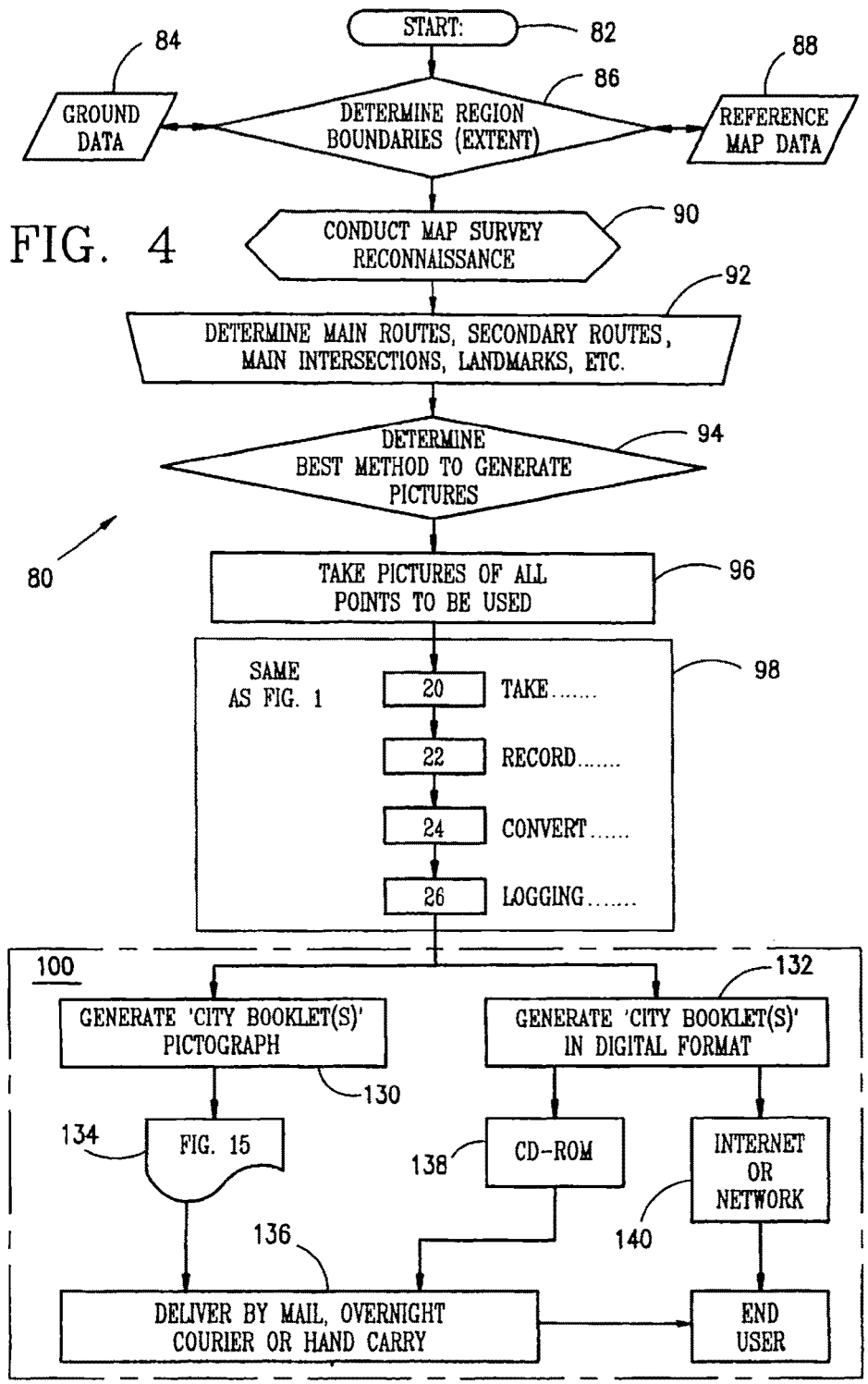
FIG. 4 is a flow chart detailing an exemplary advanced regional embodiment of a visual addressing method.

An advanced regional embodiment of a visual addressing method employing the techniques taught herein is detailed in the flow chart of FIG. 4. Whereas the previous point-to-point embodiments are concerned with guiding an end user from a particular one or more starting point(s) to a single destination, the regional visual addressing method allows for a much more generalized approach. Briefly, the regional method is carried out by compiling a large number of way points in a given region so as to facilitate guiding an end user from any one of many, or virtually any, starting point(s) within the region to any one of many, or virtually any, destination(s) within that region. The region may be as large as a major city, may encompass a college campus and/or hospital complex, and/or may be as small as a local shopping mall. All that is required is the inclusion of a sufficient number of way point photographs to permit the eventual assembly of a pictograph having enough detail to enable an end user to get from a selected starting point to a desired destination.

This regional embodiment is described first in terms of how to produce a collection of photographs to be assembled into a "city booklet" either in hard copy and/or in digital form as shown in FIG. 4, and second how an end user can use the city booklet. With concurrent reference now to FIGS. 4, 5, and 6 (and occasional brief reference to FIGS. 1-3), note that FIG. 4 describes a method 80 of implementing the regional embodiment, FIG. 5 as an illustrative city booklet 200 produced by the method of FIG. 4, and that FIG. 6 describes a method 250 of using the regional city booklet.

In blocks 82 and 86 of FIG. 4, the boundaries of the region to be covered are determined and entered. As before, many of the steps may be accomplished by manual means, by automated means, or more commonly, by using combinations of the two. The boundaries are confirmed using publicly available ground data of block 84 and reference map data of block 88. In blocks 90 and 92, the largely manual steps of conducting a map survey of the coverage region, determining the main roads and intersections, and so forth, are accomplished. Based on the results of the processes of blocks 90 and 92, a number of way points needed to define a number of routes through the city are identified. Thereafter, having this suitable number and locations of way points in hand at block 94, the best method of verifying the route and generating photographs at each way point is accomplished, as previously described. Blocks 94, 96, and 98 then process the photographs, as previously described. (Note that block 98 includes virtually the same steps as blocks 20, 22, 24, and 26 of FIG. 1.) An output section 100 functions identically to that of blocks 28 through 40 of FIG. 1, the primary difference being the control of the output pictograph and/or its digital equivalent and the providing of both hard copy pictographs via block 130 and its digital equivalent via block 132. Note the absence of a specific block which selects output type. The purpose of providing both output types is given herein below in the method of use portion of the description.

Figure 5:
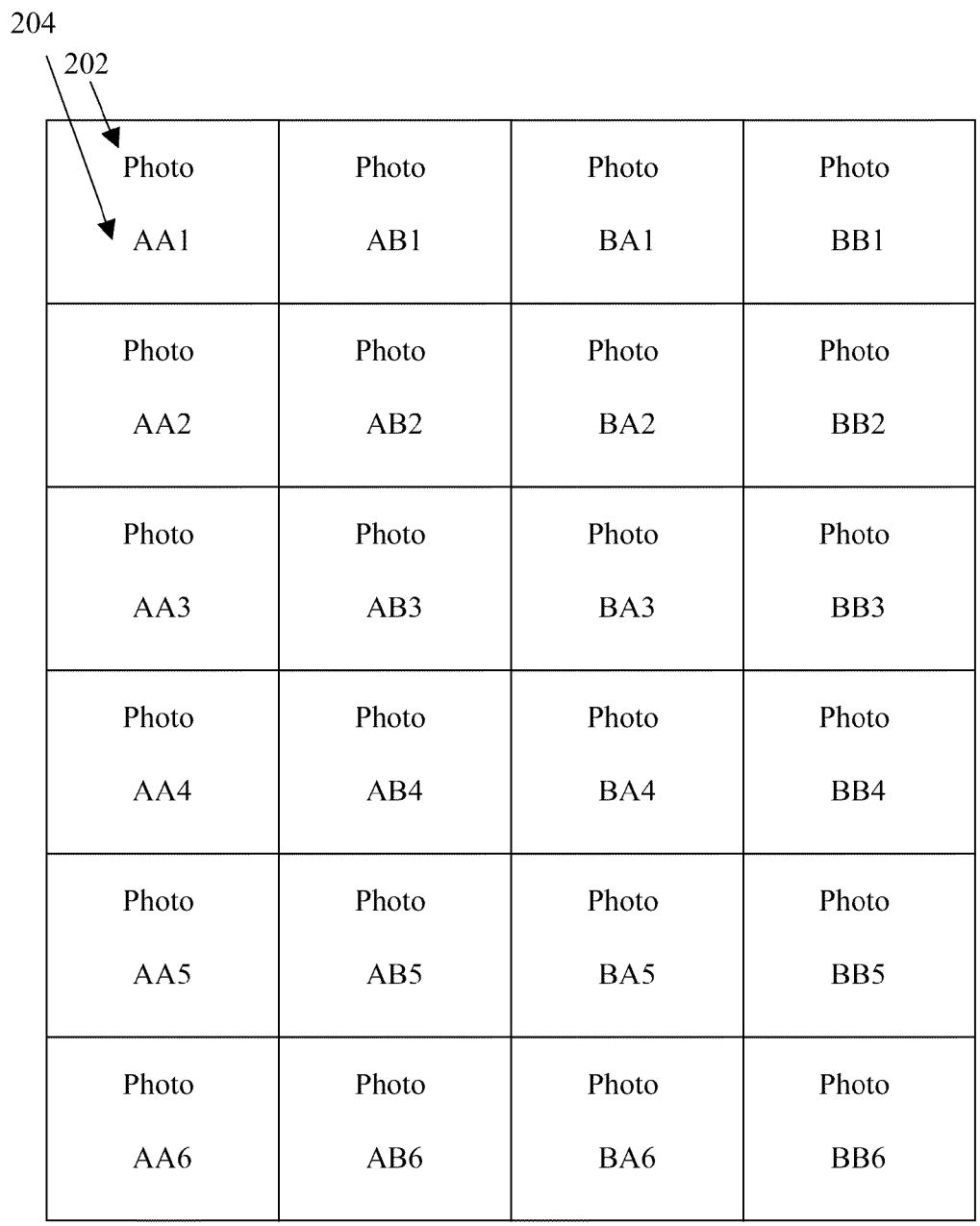
FIG. 5 is an exemplary "city booklet" pictograph produced via an exemplary embodiment of the method of FIG. 4, showing a large number of individual way point photographs assembled into an addressable array.

FIG. 5 shows a typical city booklet 200 as an array of 24 photographs arranged in addressable order. An illustrative photograph 202 shows a single way point which may be called up with reference to its internal address AA1, as shown in an address area 204. As used herein, "city booklet" describes a compilation of a plurality of photographs where the photographs are arranged in an addressable array (in hard copy and/or digital form) for subsequent use in creating a point-to-point pictograph and/or for use with a route listing. In many ways a city booklet is much the same as a pictograph, but it lacks the physical sequence or natural driving order needed to guide an end user, and it includes a number of inapplicable photographs for any one preferred route. Also, the term city booklet is used in a generic sense to denote regional visual addressing and may include an entire city, only a downtown district, or may be as circumscribed as a large shopping mall, a university and/or medical campus.

The city booklet 200 is shown, illustratively, as a single sheet containing 24 photographs. However, larger regions covered by certain exemplary embodiments of the present method and system may contain significantly more photographs displayed on a number of pages, which may be bound into a booklet, or may be left free standing. It is estimated that a relatively small city such as Leesburg, Va. might require as many as several hundred (200-700) photographs to provide reasonably fine-grained guidance to a first-time traveler to get to and from its key locations—such as it's county courthouse, municipal office buildings, shopping malls and outlets, equestrian center, and the like. All of these can be reached via Leesburg's two main access highways of Routes 7 and 15, as approached from any of the four compass points.

Figure 6:
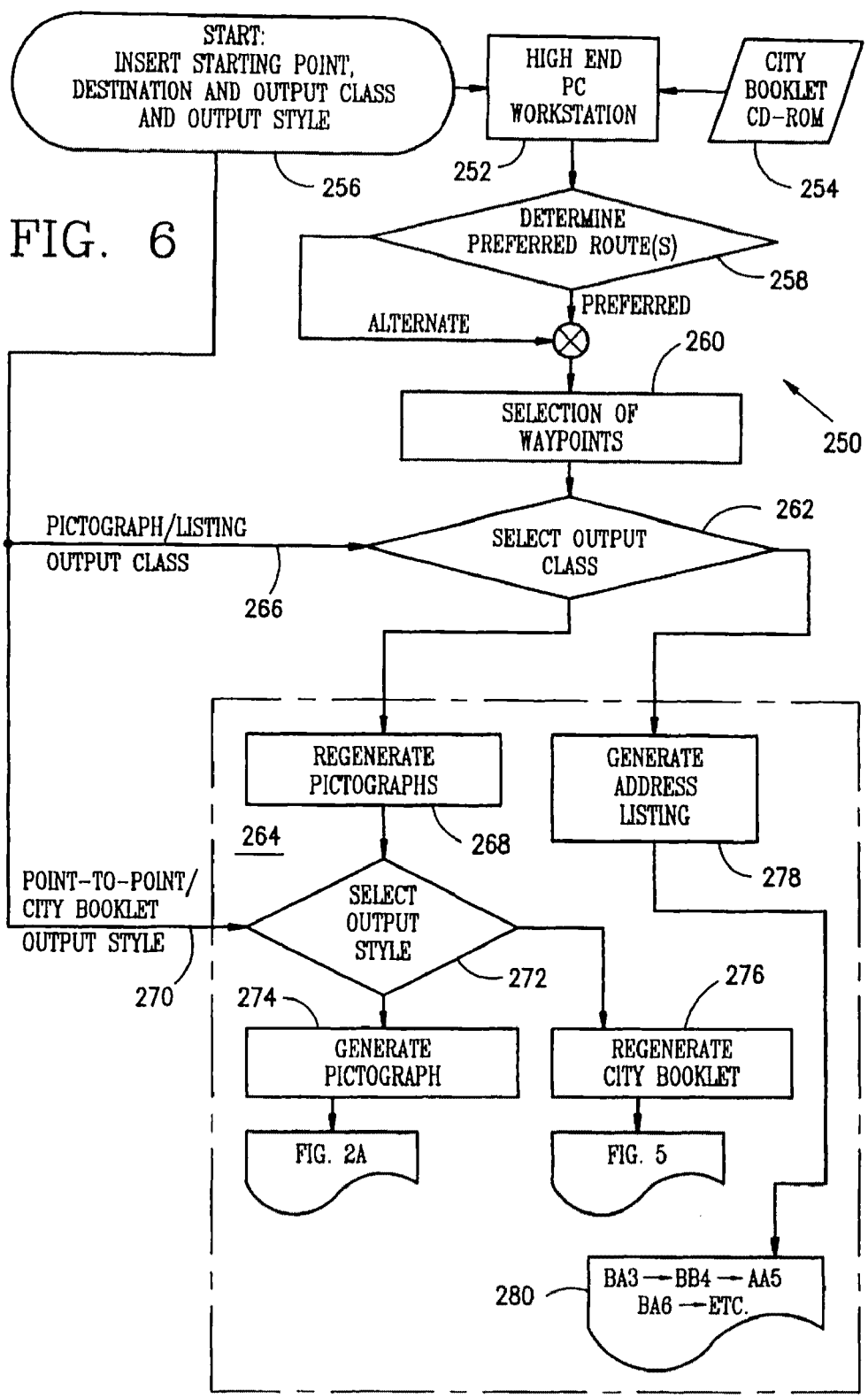
FIG. 6 is a flow chart outlining how to use an exemplary embodiment of the regional embodiment visual addressing method of FIG. 4 using an exemplary embodiment of the addressable array of photographs of FIG. 5 to generate various types of visual addressing outputs.

FIG. 6 is a flow chart detailing a preferred manner of using an addressable array of photographs such as those in the city booklet 200. A workstation-based method 250 has as its core a high-end PC 252 into which has been loaded a CD-ROM 254 containing an appropriate city booklet in digital form, such as that produced in block 138 of FIG. 4. With real time programming in operation in PC 252, an operator, (or possibly an end user) can insert a predetermined starting point and a desired destination, and/or can designate what combination of output classes and/or styles is desired via a block 256. Three possible outputs are: a point-to-point pictograph similar to that of FIG. 2; a regional city booklet as shown in FIG. 5; and/or a route listing yet to be described. In block 258 a preferred route (and possibly an alternate) can be determined by connecting a path derived by linking together a collection of way points based on their physical location addresses which were inserted during the annotation steps. Alternatively, a pre-determined route and/or its pictograph can be previously associated with a given starting point and destination, and/or stored for retrieval when the given starting point and/or destination are selected by a user. The actual selection of way points is accomplished in block 260. Because the way point photographs already exist as digital files storage 254 (e.g., CD-ROM, DVD, hard disk, server, database, Flash RAM, EPROM, tape, etc.), it is not necessary to generate them again but only to transfer them to hard copy output section 264 and/or its digital equivalent under the control of class selection block 262. In response to a designation of pictograph and/or listing signal via line 266 the user may first select a desired output class. If the pictograph output class is selected, the stored photographs regenerated in block 268 then can be transferred to produce either a point-to-point pictograph as determined by the inserted starting point and destination, similar to that of FIG. 2—or alternately to regenerate a hard copy of the city booklet of FIG. 5. Which of output styles is produced can be determined by the designation input via line 270 which can route the regenerated photographs via block 272 to blocks 274 and 276 which can generate one of the output styles, shown as FIG. 2 and/or FIG. 5.

If the listing output class is selected, block 278 generates a listing of way point addresses produced in block 260 such that the sequence of the way points constitutes the preferred route in proper driving order. This output listing can be downloaded, rendered, and/or printed out as sheet 280 and may then be used in combination with a preexisting copy of a corresponding city booklet, and/or with a newly-regenerated copy of the city booklet via blocks 272 and 276. Thereafter, an end user armed with one of two styles of pictographs and/or an address listing can, as before, be unerringly guided to his/her desired destination.

Figure 7:
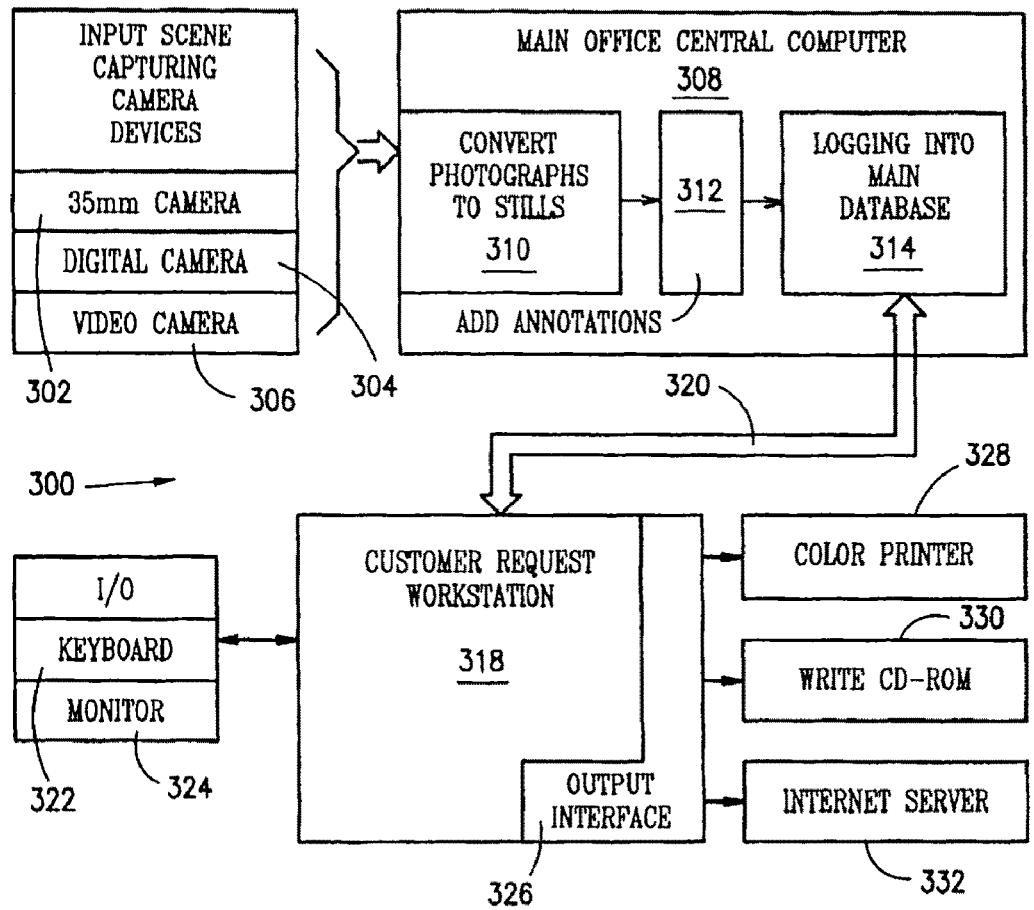
FIG. 7 is a simplified block diagram showing an exemplary apparatus by which certain exemplary embodiments of the point-to-point methods of FIGS. 1-3 can be implemented.

Referring now to FIG. 7, illustrative apparatus via which the point-to-point embodiments of FIGS. 1-3 may be implemented is shown in simplified block diagram form. A point-to-point system 300 can include one or more input scene-capturing devices, including a 35 mm camera 302, a digital camera 304 and a video camera 306. As previously detailed, the actual type of input device employed can be determined by actual scene-capturing conditions encountered—traffic, weather, time of day, etc. along the route and/or at the way point being considered. The 35 mm camera is considered as the baseline input device, and photographs can generally be taken by a windshield-mounted camera using 100, 200 and/or 400 speed film. As the rolls of film are exposed, they can be processed at, for example, a home office facility, to verify quality, way point location, database entry, and/or logging, then uploaded into, for example, a central computer, in any picture and/or graphics file format, such as JPEG, GIF, PDF, etc.

Digital camera 304, capable of using an internal memory and/or a disk (internal and/or external) and capable of being equipped with zoom/special light receiving capabilities, may also be used. In congested travel areas where additional vehicle safety is required, video camera 306 can be indicated for use. Still frame pictures can be made at predetermined road sites, landmarks, and the like while traveling. Snappy software can provide the desired conversion to compatible output types.

The bulk of the photograph processing, annotation, conversion, etc. can be accomplished on a central computer 308. In the block 310 the 35 mm photographs are converted into JPEG files, digital camera photographs are uploaded, and/or transposed video tapes are edited and/or converted to still-frame photographs. In block 312, photograph annotations and other control inputs can be added via a keyboard 322, and all data and photographs can be assembled into a main database 314, which can reside on a web server. In a preferred basic embodiment, the database 314 may be implemented using a minimum Microsoft Windows operating system running on a computer comprising an Intel 486, Pentium, or Pentium Pro and/or higher processor; 16 MB of RAM; 8-bit (256-color) or greater display adapter; and a 2×CR-ROM drive or faster). Alternatively, the database 314 can be implemented using any of the following operating systems: Windows 3.1x with DOS 5.0 or later, Windows 95, Windows NT (version 3.5.1 or greater), Windows XP, Windows Vista, etc.

Production of pictographs can be accomplished using a personal computer customer request workstation 318 which can communicate with the main database 314 via a bidirectional bus 320 and/or network, such as the Internet, a local area network, a wide area network, a virtual private network, a wireless network, etc. The workstation 318 can include I/O devices such as a keyboard 322, monitor or display 324, speaker, microphone, and/or an output interface 326. Responsive to specialized programming running in the workstation 318, and/or operator commands entered via keyboard 322, any of three output means may be enabled. A printer 328 can generate the pictograph sheet, booklet, and/or brochure (per 138 of FIG. 4) when called for. A local storage device, such as a hard disk, RAM, flash RAM, EPROM, tape drive, DVD-RAM, and/or CD-RW drive 330 can store the digital equivalent of a pictograph (per 38 of FIG. 1) and/or a city booklet (per 138 of FIG. 4) as required. A network and/or network-connected server, such as an internet server 332, e.g., a file server and/or web page server, can provide the various outputs in digital form (per 140 of FIG. 4 and/or per 40 of FIG. 1).

Figure 8:
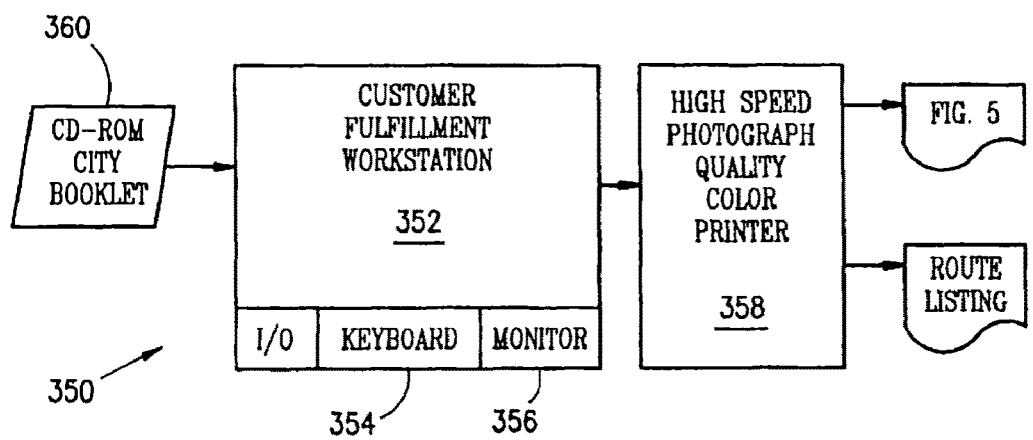
FIG. 8 is a simplified block diagram showing an exemplary apparatus by which certain exemplary embodiments of the regional method of FIGS. 4-6 can be implemented.

FIG. 8 shows an illustrative apparatus, in simplified block diagram form, via which the regional embodiment described in FIG. 6 may be used. A regional use system 350 can be based on the capabilities of an information device 252, such as a personal computer, laptop, and/or Personal Digital Assistant (PDA), graphical display empowered cell phone, etc., serving as the core of a customer fulfillment workstation. The fulfillment workstation 352 can include I/O devices such as a keyboard 354 and/or other input device (e.g., microphone with voice recognition software, touch screen, trackpad, scroll wheel, navigation buttons, retinal tracker, etc.), a speaker, a monitor and/or display 356, and/or a printer, such as a laser printer, an ink jet printer, and/or a photographic quality color printer 358. Upon loading a CD-ROM 360 containing a regional city booklet, such as item 138 of FIG. 4, and/or downloading such a booklet, and/or accessing a web site containing such a booklet, and entering one or more starting points, destinations, and/or output classes and/or styles as requested by a customer and/or end user, the fulfillment workstation 352 can produce the desired outputs. The operating system resident in the workstation 352 can function as previously described in connection with output block 100 of FIG. 4, with the exception that workstation 352 does not necessarily need to replicate the Internet and/or network outputting capability. Thus, the customer fulfillment workstation 352 can render (i.e., make perceptible) and/or generate a hard copy of a pictograph, city booklet, and/or route listing (per 276 of FIG. 6) for guiding an end user from the inputted starting point(s) to the inputted destination(s).

Figure 9:
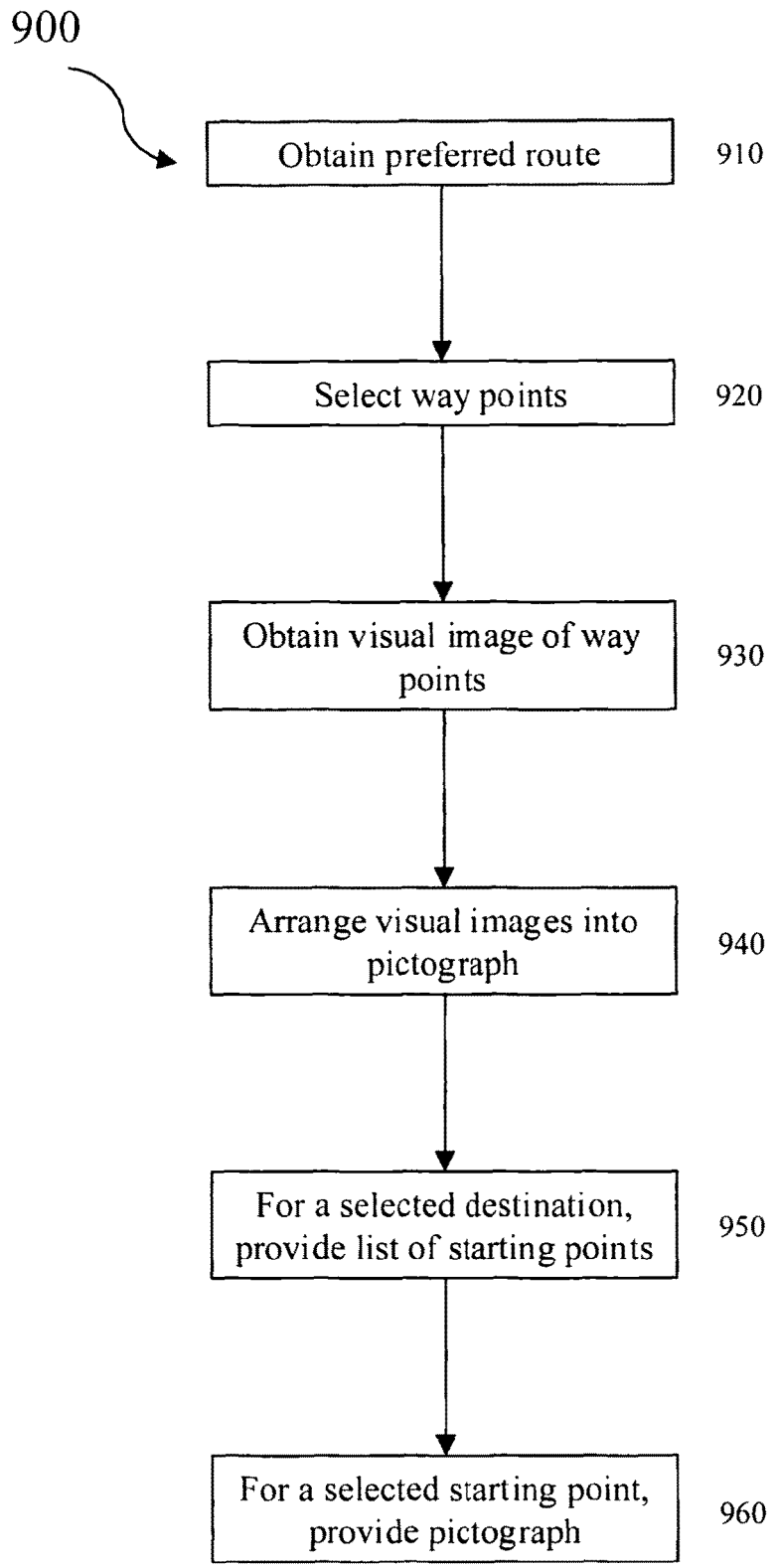
FIG. 9 is a flow diagram of an exemplary embodiment of a method 900.

FIG. 9 is a flow diagram of an exemplary alternative embodiment of a method 900. At activity 910, a preferred route is obtained, the route extending from a first starting point, such as a first approach, to a first destination. At activity

920, before, during, and/or after physically verifying the route, a sequential set of way points along the route is selected. At activity 930, a visual image of each of the selected way points is obtained, as described supra. At activity 940, the set of visual images of the selected way points is arranged in a static viewable sequential order, such as a sequentially-ordered pictograph and/or city booklet, sequence matching what a traveler following the route would perceive. At activity 950, in response to a user's selection of the first destination, a set of predetermined starting points can be rendered to the user. At activity 960, in response to a user's selection of a first predetermined starting point from the set of predetermined starting points, the set of visual images can be provided to the user, such as via a downloaded digital file, a rendered digital file, a displayed web page, and/or a hard copy, etc., and formatted as a pictograph, city booklet, and/or route listing, etc. If provided digitally, the user can generate a hard copy of the set of visual images as desired.

In certain exemplary embodiments, any visual image and/or the set of visual images can be annotated, associated, and/or augmented with one or more textual descriptions associated with at least a portion of the route (e.g. a highway of the route, a way point along the route, etc.), the textual descriptions comprising driving instructions, mileage measurements, suggestions for sites of interest (e.g., tourist attractions, overlooks, rest areas, shopping, restaurants, etc.), driver warnings, etc. Such textual descriptions can be provided to a traveler and/or user at the option of the service provider and/or the traveler and/or user. If provided to the traveler and/or user, such textual descriptions can be stored, output, rendered, and/or printed at the discretion and/or selection of the traveler and/or user.

In certain exemplary embodiments, any visual image and/or the set of visual images can comprise, and/or can be annotated, associated, augmented, and/or replaced with, one or more videographic and/or video images and/or descriptions associated with at least a portion of the route, each video description comprising one or more videos, which can be created in much the same way as the photographic visual images, except with the aid of an analog and/or digital video recording device (e.g., analog camcorder, digital camera with video capability, digital camcorder, etc.). Such video descriptions can be provided to a traveler and/or user at the option of the service provider and/or the traveler and/or user. If provided to the traveler and/or user, such video descriptions can be stored, output, rendered, played, and/or printed at the discretion and/or selection of the traveler and/or user. The content and/or playback (e.g., starting point, ending point, displayed frames, progression, speed, refresh rate, fidelity, etc.) of such a video description can be predetermined, associated with a current location, route, way point, and/or travel speed, and/or controlled by a person viewing the video description.

In certain exemplary embodiments, any visual image and/or the set of visual images can be annotated, associated, augmented, and/or replaced with one or more audio descriptions associated with at least a portion of the route, each audio description comprising one or more audio recordings, clips, and/or samples, which can be created in much the same way as the photographic visual images, except with the aid of an analog and/or digital audio recording device (e.g., tape recorder, digital audio recorder, digital camera with analog annotation and/or recording capability, analog or digital camcorder, etc.). Such audio descriptions can be provided to a traveler and/or user at the option of the service provider and/or the traveler and/or user. If provided to the traveler and/or user, such audio descriptions can be stored, output, rendered, and/or played at the discretion and/or selection of the traveler and/or user. The content and/or playback (e.g., starting point, ending point, rendered clips, progression, speed, volume, fidelity, etc.) of such an audio description can be predetermined, associated with a current location. route, way point, and/or travel speed, and/or controlled by a person listening to the audio description.

In certain exemplary embodiments, any visual image and/or the set of visual images can be annotated, associated, augmented, and/or replaced with one or more computer-generated objects associated with at least a portion of the route, each object comprising one or more graphics, images, controls, and/or animations, etc. Such computer-generated objects can be provided to a traveler and/or user at the option of the service provider and/or the traveler and/or user. If provided to the traveler and/or user, such computer-generated objects can be stored, output, rendered, printed, and/or played at the discretion and/or selection of the traveler and/or user.

In certain exemplary embodiments, a pictograph, city booklet, and/or route listing can include one or more promotional items at any location in the pictograph, city booklet, and/or route listing. A promotional item can be provided depending on the starting point, destination, route, way points, etc. The promotional item can be modified dynamically, so that, for example, any hard copy output, screen displays, and/or digital files provided after the modification to the promotional item can contain the modified promotional item.

Moreover, the promotion item can provide a link to, for example, a second pictograph showing a route to a location of the promoter and back to the original pictograph, route, etc. As a further example, if a first pictograph leads a traveler on a route from an airport to a hotel, a promotional item included and/or associated with the first pictograph, including possibly an icon, can link the traveler to a second pictograph that leads the traveler to a restaurant and then back to the route of the first pictograph, and/or even directly to the hotel from the restaurant.

In certain exemplary embodiments, a pictograph, city booklet, and/or route listing can be requested and/or provided from a kiosk. Thus, a traveler at an airport, car rental counter, bus station, subway station, port, mall, business, street corner, etc. who does not currently personally possess a network-connectable and/or network-connected information device (e.g., a personal computer, personal digital assistant, web-enabled cell phone, etc.) and/or a printer can still obtain a pictograph, city booklet, and/or route listing.

In certain exemplary embodiments, a pictograph, city booklet, and/or route listing can augment and/or enhance an existing navigation system, such as, for example, OnStar, Mapquest, etc., and/or can be used to verify a route provided by such an existing navigation system.

In certain exemplary embodiments, a pictograph, city booklet, and/or route listing can be provided via alternative information devices, such as wrist watch display, a television, a portable DVD player, a hologram projector, an automobile visor display, a windshield projection system, a portable navigation device, etc. For example, a pictograph, city booklet, and/or route listing can be holographically, photographically, and/or videographically projected such that it appears to be displayed approximately on (i.e., on, near, slightly behind, and/or slightly in front of) at least a portion of an automobile windshield, in front of the traveler, in the actual direction, and/or in the direction of the route.

In certain exemplary embodiments, a pictograph, city booklet, and/or route listing can be provided in a format that is designed for use with a particular type of information device. For example, a user can request a pictograph that is formatted for use with a Treo 300 handheld communicator, available from Handspring Inc. of Mountain View, Calif. At a minimum, such a pictograph can be compatible with the operating system of the information device. Moreover, such a pictograph can include visual images that have sufficient, but not excessive resolution for the selected information device, are color-adjusted to optimize the display capabilities of the information device, fit on the screen of the information device without the need for scrolling, conserve power of the information device, and/or transfer rapidly to the information device, etc.

Certain exemplary embodiments can provide a method comprising, for a predetermined route, automatically processing a first set of machine instructions to create a visual travel guide (e.g., video guide, photo guide, pictograph, city booklet, and/or route listing, etc.) for the predetermined route, the visual travel guide comprising a second set of machine instructions adapted to cause an information device to render: an identification of a destination of the predetermined route; a plurality of videos, each video corresponding to a road intersection located approximately on the predetermined route, each video adapted to substantially reproduce a view of a driver of an automobile approaching the road intersection; a plurality of textual descriptions associated with the plurality of videos; at least one of an identification of an origin of the predetermined route and an identification of an approach to the destination; and an advertisement associated with at least a portion of the predetermined route.

In certain exemplary embodiments of a baseline method for providing visual guidance to a traveler, motorist, and/or end user, a series of way point videos can be compiled into, and/or utilized in, individual routes that provide a means of travel guidance to a specified and/or general destination. Route videos can be available via a network such as the Internet, thus allowing an end user to view video routes and/or portions of video files stored in a data base as a travel guide to direct travelers along one or more routes to one or more predetermined destinations.

Figure 10:
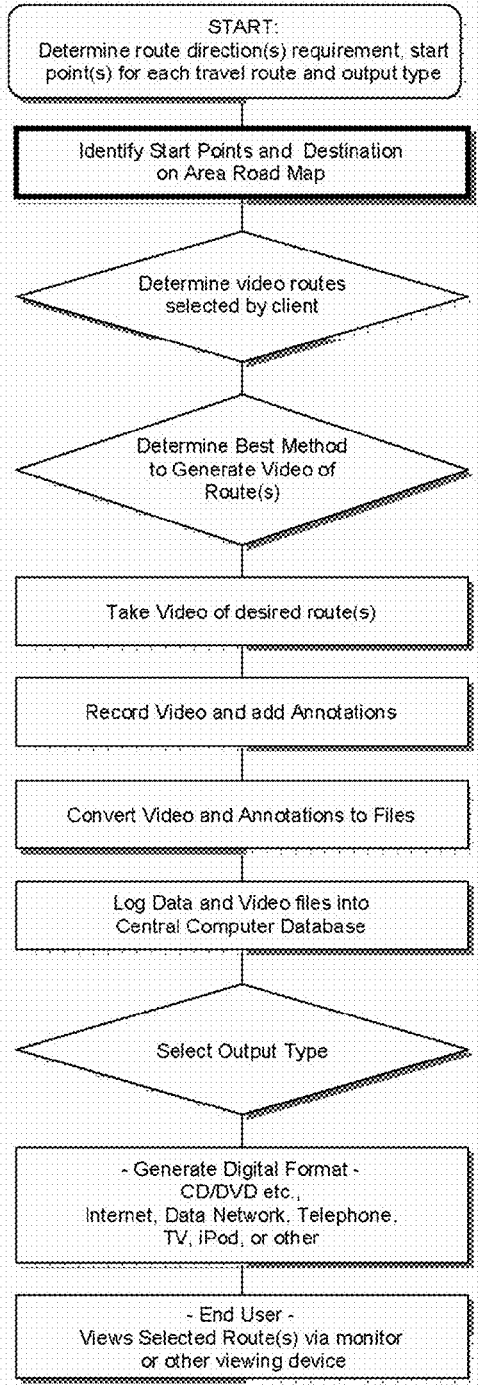
FIG. 10 is a flow diagram of an exemplary embodiment of a method for video routing.

A video can be produced by a human who physically traverses a route between a predetermined starting point and desired destination, capturing video scenes of selected way points using any of a variety of scene-capturing devices, while verifying and/or proving the validity, viability, and/or practicality of the route. This video can be annotated, processed, stored, and/or subsequently retrieved as needed for delivery to an end user. See FIG. 10.

In an advanced regional method for providing visual guidance between a plurality of starting points and a plurality of destinations—all within the boundaries of the region—a large number of videos can be taken and compiled into a city CD/DVD or other. Thereafter, responsive to specific end-user requests detailing one or more starting points and/or one or more destinations, routes can be provided, and/or selected by joining paths of way points based on their locations, to produce a listing of video routes. In either the point-to-point and/or regional approach, the end user can be guided by visually viewing the videos of actual road intersections (or other) with superimposed directional arrows and descriptive text with the road actually being traveled as seen through the traveler's windshield and/or eyes.

Such video travel guides can be useful for guiding travelers, such as tourists, visitors, customers, clients, potential buyers, guests, delivery personnel (e.g., delivering, documents, packages, pizza, flowers, vending machine contents, inventory, and/or supplies, etc.), those following established routes (e.g., bus drivers, truckers, mail carriers, newspaper carriers, etc.), those attending real estate and/or garden tours, those touring and/or navigating a building's and/or property's external and/or internal features (e.g., potential home buyers, new students in a large school building and/or campus, workers in an industrial facility, etc.), hikers, boaters, aircraft pilots, racers, police, emergency personnel, and military operations.

In certain exemplary embodiments of a baseline method for providing visual guidance to a traveler, motorist, or end user, video directions may be designated to have more than one directional start point for directing an end user to his/her desired destination.

Prior to creating an on-line video travel guide, one can determine a desired destination, approach direction, path, turns, and/or origin for each particular route. An end user might only desire a single route from a specific origin to a specific destination and/or might desire multiple routes to a specific destination.

Via use of a digital video camera (and/or other video capturing device), via scanning traditional photos, and/or via download and/or transfer of photos/videos from a commercial and/or public domain database and/or other repository of photos/videos, a route developer can obtain photos/videos of relevant turns, intersections, and/or landmarks, etc., along the particular route and/or the output could be rendered in an animated video and/or stream format. The provider can offer a database of videos, photos, audios, maps, and/or other relevant information, such as factual information, annotations, and/or advertisements, etc., associated with a given video, destination, approach direction, path, turns, origin, route, and/or vicinity thereof, etc. The database can be made available for a subscriber to, via license, lease, and/or purchase, etc., provide content to the host and/or others and/or obtain content.

Via a human physically traversing each desired route, such as via automobile, study of physical and/or on-line maps, and/or research of commercial and/or public domain databases, such as a geographical information system (GIS) database, the user, provider, and/or subscriber can obtain factual information associated with that route, such as distances between intersections, compass headings, road names and/or numbers, descriptions of landmarks, number of intersections between desired turns, and/or number of traffic lights between desired turns, etc. Conversely, the user, provider, and/or subscriber can generate, publish, transfer, enter into a database and/or GIS, and/or make available to others such factual information. For example, a provider and/or subscriber can provide a count of traffic lights between intersections for use by others, such as other subscribers, MapQuest, OnStar, etc.

To create an on-line visual travel guide and/or video guide, one can interact, such as via a web browser, with the provider software to:
  determine, specify, and/or indicate the desired destination, approach direction, path, turns, and/or origin for the particular route;
  upload, transfer, enter, tag, seek, obtain, and/or select the desired content for the particular route;
  convert standard video formatting to SWF, FLV, web streaming and/or any other appropriate format and/or resize and/or compress files (for fast usage) prior to uploading and/or after uploading;
  crop, trim, and/or touch-up videos as desired;
  add still frame photographs to video format and/or place another video within a route video to enhance directions, add advertisement, etc.;
  specify a sequence and/or arrangement for the videos;

specify an arrangement for any factual information and/or other content;

enter, specify, and/or transfer annotations, such as text, graphics, audio recordings, video recordings, animations, and/or controls, such as arrows, highlighting, compass headings, notes, icons, sketches, comments, and/or links to information about landmarks and/or relevant excursions, etc., to be associated with and/or positioned over, within, and/or near the photos/videos and/or factual information; and/or manage, access, render, view, label, tag, edit, and/or modify the content, structure, and/or arrangement, etc., of the video guide as desired;

specify who may access, copy, render, stream, view, print, edit, and/or modify the video guide and/or any portion thereof;

provide, revise, and/or manage content that is: associated with a particular video guide provided by the subscriber; not associated by that subscriber with a particular video guide; associated with a video guide of another; and/or is available for use in assembling a video guide; etc.

A server can run software that allows travelers to link to, subscribe to, locate, view, print, stream, extract, receive, and/or download information, content, and/or meta-data in any desired file format (e.g., pdf, html, xml, doc, and/or jpg, .swf, .flv, etc.), one or more video travel guides, routes, photos, factual information, annotations, advertisements, etc., created, provided, published, by a subscriber and/or others. For example, the server can provide a hyperlink to a web page and/or blog comprising a video travel guide, route, photo, and/or content, etc. Upon activating the hyperlink, a traveler can be presented with a rendering of a video travel guide, either via being re-directed to and viewing the web page and/or via downloading the video travel guide. If desired, the traveler can download reader software for a downloaded video travel guide, so that the traveler can access and/or utilize the video travel guide even when access to the server is unavailable.

For example, a mobile traveler can select a destination, and an embodiment of the software can:

determine the traveler's current location;

determine the traveler's current direction of travel;

determine an appropriate route and/or corresponding video travel guide to direct the traveler to the selected destination from the traveler's current and/or anticipated location;

obtain the determined video travel guide and/or route, and/or render the determined video travel guide and/or route to the mobile traveler, such as via an in-vehicle display and/or via a mobile information device.

Rather than selecting a single and/or specific destination, a traveler can request sub-destinations and/or destinations generally and/or parametrically. For example, a mobile traveler can request a display of any 4 star or better rated Chinese take-out restaurants within 5 minutes of any location along a current route. In response, the software can generate, on an ad hoc basis, a video travel guide to any selected one of such restaurants. As another example, a mobile traveler can request a video travel guide to the gasoline station located within 10 minutes of the traveler's current location, located no more than 2 minutes from the traveler's route, and that offers the lowest price for regular gas.

Rather than being pre-assembled by a particular subscriber, the host can create, assemble, and/or modify a video guide on-the-fly using information provided by a traveler and/or known about the traveler and/or one or more aspects of a potential route for the traveler. For example, based on a known current location, direction of travel, and destination and/or type of destination for a traveler, the host can determine a route to the destination and/or a route to each destination of the type of destination. By tapping its database of content, the host can assemble and/or retrieve a video guide for each route. As another example, if the host knows of an actual problem and/or potential problem associated with a particular route, such as travel delays due to speed limits, traffic lights, construction, accident, heavy traffic, etc., poor road conditions, lack of rest stops and/or other desired conveniences, etc., the host can communicate that problem and/or determine a different route, and assemble and/or retrieve a video guide for that different route. As another example, if the host determines that a video guide and/or route that was previously provided to a traveler has developed such a problem and/or potential problem, the host can notify the traveler, assemble an alternative route and/or video guide, and/or offer and/or provide that alternative route and/or video guide to the traveler, etc. As another example, a subscriber can provide updated content, such as a report of a problem and/or potential problem, that can be used to update and/or modify the host's database(s) and/or to create, assemble, update, and/or modify one or more routes and/or video guides.

A video travel guide can be rendered in sequential portions and/or in its sequential entirety. For example, a traveler can request that only those portions of a video travel guide that are relevant to the mobile traveler's current location be rendered, the rendered portions changing in sequence as the traveler's location changes. By way of further example, as the mobile traveler approaches a turn, the video travel guide can present only a photograph/video of the turn that corresponds to the approximate distance the traveler currently is from the turn, thereby simulating and/or reproducing the traveler's current and/or very soon upcoming perspective of the turn. As the mobile traveler gets closer to the turn, a different photo/video can be displayed, this photo/video approximately corresponding to the mobile traveler's new position and/or distance from the turn. If appropriate and/or requested, the software can provide visual and/or audio warnings and/or tips to the traveler, such as "slow down!", "turn approaching in 200 feet", and/or "oops, missed it, turn around", etc.

In certain exemplary embodiments, one can specify a destination and/or origin for a route by typing one or more addresses and/or by clicking on and/or touching a rendered map. One can specify a path and/or turns along the route by typing, clicking, and/or via dragging a pointer and/or finger across the map. Thus, one can essentially "trace" and/or otherwise specify the desired route on the rendered map to indicate the desired destination, approach direction, path, turns, and/or origin for the particular route. The map can be linked to GPS information, such that relatively precise location information, comprising longitude, latitude, and/or azimuth, etc., information can be gathered and/or associated with the desired destination, approach direction, path, turns, and/or origin for the particular route. As one traces and/or otherwise specifies a desired route, thumbnail photographs associated with the route's origin, approach direction, path, turns, and/or destination can be interactively rendered to the user and/or subscriber, such as in a sequential order (video and/or other) for a traveler.

Alternatively, given at least one's desired destination, the software can propose origins, approaches, paths, turns, and/or accompanying photos, factual information, and/or annotations, etc. Thus, for example, given a destination address and/or an origin address, the software can automatically generate a video travel guide, route, photographs within video, etc.

As mentioned earlier, the server can host software that allows a subscriber to upload content, such as photos, videos, advertisement, factual information, annotations, tags (e.g., classifying labels, keywords, markups, embedded codes, markup language elements, HTML elements, SGML elements, XML elements, RSS tags, bookmarks (e.g., flicker and/or del icio us bookmarks and/or tags), etc.), links, to be embedded within any video presentation/route, etc., associated with a given video guide, destination, approach direction, path, turn, origin, route, and/or vicinity thereof, etc., for others to obtain, lease, license, and/or purchase, etc. The host can access, use, receive, store, relationally associate, link to, tag, create, assemble, provide, feed, stream, buy, sell, lease, license in, license out, and/or manage content. The host can provide and/or specify standard and/or customized terms, such as terms of use, license fees, royalties, and/or other compensation, payment methods, ownership, assignment, and/or transfer of rights, copyright permissions, restrictions, limitations, warranties, disclaimers, indemnifications, dispute resolution, controlling law, termination, and/or severability, etc., for subscribers and/or others to provide, store, relationally associate, link to, tag, create, assemble, stream, manage, access, and/or use content. Thus, the host can serve as a content exchange, repository, assembly tool, auctioneer, seller, and/or provider, etc.

For example, license fees and/or royalties can be based, for example, on the number of video guide showings in which a specific video is used, the period of time over which particular content is used, the number of times certain content is accessed for a given route, advertisements rendered, click-throughs for advertisements, etc. Thus, for example, annotated videos of a busy intersection, which happens to be popular with travelers and/or subscribers who are creating routes, might receive substantial licensing revenues due to a high volume of access of those photographs by travelers who access such routes. A royalty, on the other hand, might have to be paid for each insertion in a guide, access by a user of a guide, etc. Ownership rights and/or copyrights to the provided content can be retained by the subscriber and/or transferred to the host. As another example, an advertiser might pay a larger advertising fee for an ad that accompanies one or more photographs of a highly popular intersection. Fees can be paid by subscribers, travelers, and/or advertisers, etc. Content can be stored, indexed, and/or referenced from the host's database(s). In certain exemplary embodiments, rather than uploading content to be stored on the host's memory device, a subscriber can store the content on the subscriber's memory device and/or some other memory device, and simply provide a link to that content. Such a link can be stored in the host's database(s).

Certain exemplary embodiments of providing visual guidance can provide a technique for a provider to create/a subscriber to access/a traveler to use, via a network such as the Internet, server-based sequencing software that can allow a provider and/or subscriber to upload visuals (photos, videos, etc.) to the server via a web site, arrange the visuals into a desired sequence, add content to overlay and/or accompany the visuals, such that the visuals and any portion of the additional content can be rendered on-line and/or viewed (via monitor) and/or as a hardcopy in sequential order as a visual guide to direct a traveler along one or more routes to one or more predetermined destinations.

Such visual travel guides can be useful for guiding travelers, such as tourists, visitors, customers, clients, potential buyers, guests, delivery personnel (e.g., delivering, documents, packages, pizza, flowers, vending machine contents, inventory, and/or supplies, etc.), those following established routes (e.g., bus drivers, truckers, mail carriers, newspaper carriers, etc.), those attending real estate and/or garden tours, those touring and/or navigating a building's and/or property's external and/or internal features (e.g., potential home buyers, new students in a large school building and/or campus, workers in an industrial facility, etc.), hikers, boaters, aircraft pilots, racers, police, emergency personnel, meter readers, etc., to any desired destination. For example, a real estate agent and/or a homeowner can create, revise, provide, and/or publish a visual travel guide of the interior and exterior of the home as well as routes to the home from various approaches and/or locations.

Prior to creating and/or using an on-line visual travel guide, one can determine a desired destination, approach direction, path, turns, and/or origin for each particular route, as visual travel guides may be designated to have more than one directional start point for directing a traveler to a destination. The provider/subscriber/traveler might only desire a single route from a specific origin to a specific destination and/or the Provider/subscriber/traveler might desire multiple routes to a specific destination.

Via use of a camera and/or camcorder, via scanning traditional photos, and/or via download and/or transfer of photos from a commercial and/or public domain database and/or other repository of photos, the provider and/or subscriber can obtain photos of relevant turns, intersections, and/or landmarks, etc., along the particular route. Via use of a camera and/or camcorder, via copying videotape, and/or via download and/or transfer of videos from a commercial and/or public domain database and/or other repository of videos, the provider and/or a subscriber can obtain videos of relevant turns, intersections, and/or landmarks, etc., along the particular route. The server and/or host site can offer a database of such photos, videos, and/or other content along with relevant information, such as factual information, annotations, and/or advertisements, etc., associated with a given photo, video, destination, approach direction, path, turns, origin, route, and/or vicinity thereof, etc. The provider database can be made available for a subscriber to, via license, lease, and/or purchase, etc., provide content to the provider and/or others and/or obtain content for the subscriber and/or traveler.

Via physically traversing the travel routes between predetermined starting points and desired destinations, study of physical and/or on-line maps, and/or research of commercial and/or public domain databases, such as a geographical information system (GIS) database, the provider and/or a subscriber can obtain factual information associated with that route, such as distances between intersections, compass headings, road names and/or numbers, descriptions of landmarks, number of intersections between desired turns, and/or number of traffic lights between desired turns, etc. Conversely, the provider and/or a subscriber can generate, publish, transfer, enter into a database and/or GIS, and/or make available to others such factual information. For example, the provider and/or a subscriber can provide a count of traffic lights between intersections for use by others, such as the provider and/or other subscribers, MapQuest, OnStar, etc.

The photographs, videos, and/or other scene-capturing objects can be obtained when and/or while a human physically traverses the routes between predetermined starting points and desired destinations, capturing scenes of selected way points using any of a variety of scene-capturing devices, while verifying and/or proving the validity, viability, and/or practicality of the route. These photographs, videos, and/or other scene-capturing objects then can be edited, enhanced, annotated, processed, stored, and/or subsequently retrieved as needed for delivery to an end user.

In an advanced regional method for providing guidance between a plurality of starting points and a plurality of destinations—all within the boundaries of the region—a large number of photographs, videos, other can be compiled into a city CD/DVD and/or other assembly. Thereafter, responsive to specific end-user requests detailing one or more starting points and/or one or more destinations, routes can be provided, and/or selected by joining paths of way points based on their locations, to produce a photo, video, and/or other route listing. In the point-to-point and/or regional approach, the end user can be guided by visually viewing the photos, videos, and/or other of actual road intersections (or other) with superimposed directional arrows and descriptive text with the road actually being traveled as seen through the traveler's windshield and/or eyes.

To create an on-line visual travel guide, the provider and/or subscriber can interact, such as via a web browser, with the host software to:

determine, specify, and/or indicate the desired destination, approach direction, path, turns, and/or origin for the particular route;

upload, transfer, enter, tag, seek, obtain, and/or select the desired content for the particular route;

convert photos to a standard size (e.g., 340 pixels by 270 pixels, etc.), resolution (e.g., 72, 150, 300, etc., dots per inch), and/or format (e.g., JPEG, TIFF, bitmap, etc.), prior to uploading and/or after uploading;

convert standard video formatting to SWF, FLV, web streaming, and/or other format and then resize and/or compress files (for fast usage) prior to uploading and/or after uploading;

edit, crop, trim, and/or touch-up videos and/or photos as desired;

insert content such as text into videos and/or photos;

specify a sequence and/or arrangement for the videos and/or photos;

specify an arrangement for any factual information and/or other content;

enter, specify, and/or transfer annotations, such as text, graphics, audio recordings, video recordings, animations, and/or hyperlinks, such as arrows, highlighting, compass headings, notes, icons, sketches, comments, and/or links to information about landmarks and/or relevant excursions, etc., to be associated with and/or positioned over, within, and/or near the videos, photos, other and/or factual information; and/or manage, access, render, view, label, tag, edit, and/or modify the content, structure, and/or arrangement, etc., of the visual travel guide as desired;

specify who may access, render, stream, view, print, edit, and/or modify the visual travel guide and/or any portion thereof;

provide, revise, and/or manage content that is: associated with a particular visual travel guide provided by the provider and/or a subscriber; not associated by that provider and/or a subscriber with a particular visual travel guide; associated with a visual travel guide of another; and/or is available for use in assembling a visual travel guide; etc.;

etc.

The server can run software that allows travelers to link to, subscribe to, locate, view, print, stream, extract, receive, and/or download information, content, and/or meta-data in any desired file format (e.g., pdf, html, xml, doc, jpg, mpeg, wav, QuickTime, swf, and/or flv, etc.), one or more visual travel guides, routes, photos, videos, factual information, annotations, advertisements, etc., created, provided, published, by the provider and/or a subscriber and/or others. For example, the server can provide a hyperlink to a web page and/or blog comprising a visual travel guide, route, photo, video, and/or content, etc. Upon activating the hyperlink, a traveler can be presented with a rendering of a visual travel guide, either via being re-directed to and viewing the web page and/or via downloading the visual travel guide. If desired, the traveler can download reader software for a downloaded visual travel guide, so that the traveler can access and/or utilize the visual travel guide even when access to the server is unavailable For example, a mobile traveler can select a destination, and an embodiment of the software can:

determine the traveler's current location;

determine the traveler's current direction of travel;

determine an appropriate route and/or corresponding visual travel guide to direct the traveler to the selected destination from the traveler's current and/or anticipated location;

obtain the determined visual travel guide and/or route, and/or render the determined visual travel guide and/or route to the mobile traveler, such as via an in-vehicle display and/or via a mobile information device.

Rather than selecting a single and/or specific destination, a traveler can request sub-destinations and/or destinations generally and/or parametrically. For example, a mobile traveler can request a display of any 4 star or better rated Chinese take-out restaurants within 5 minutes of any location along a current route. In response, the software can generate, on an ad hoc basis, a visual travel guide to any selected one of such restaurants. As another example, a mobile traveler can request a visual travel guide to the gasoline station located within 10 minutes of the traveler's current location, located no more than 2 minutes from the traveler's route, and that offers the lowest price for regular gas Rather than being pre-assembled by a particular provider and/or subscriber, the provider and/or server can assemble and/or modify a visual travel guide on-the-fly using information provided by a traveler and/or known about the traveler and/or one or more aspects of a potential and/or traditional route for the traveler. For example, based on a known current location, direction of travel, and destination and/or type of destination for a traveler, the host can determine a route to the destination and/or a route to each destination of the type of destination. By tapping its database of content, the host can assemble and/or retrieve a visual travel guide for each route. As another example, if the host knows of an actual problem and/or potential problem associated with a particular route, such as travel delays due to speed limits, traffic lights, construction, accident, heavy traffic, etc., poor road conditions, lack of rest stops and/or other desired conveniences, etc., the host can determine a different route, and assemble and/or retrieve a visual travel guide for that different route. As another example, if the host determines that a visual travel guide and/or route that was previously provided to a traveler has developed a problem and/or potential problem, the host can notify the traveler, assemble an alternative route and/or visual travel guide, and/or offer and/or provide that alternative route and/or visual travel guide to the traveler, etc. As another example, a provider and/or a subscriber can provide updated content, such as a report of a problem and/or potential problem, that can be used to update and/or modify the host's database(s) and/or to create, assemble, update, and/or modify one or more routes and/or visual travel guides.

A visual travel guide can be rendered in sequential portions and/or in its sequential entirety. For example, a traveler can request that only those portions of a visual travel guide that are relevant to the mobile traveler's current location be rendered, the rendered portions changing in sequence as the traveler's location changes. By way of further example, as the mobile traveler approaches a turn, utilizing the known location of the traveler, such as via a GPS receiver, the visual travel guide can present only a video and/or a photograph of the turn that corresponds to the approximate distance the traveler currently is from the turn. As the mobile traveler gets closer to the turn, a different video and/or photo can be displayed, this video and/or photo approximately corresponding to the mobile traveler's new position and/or distance from the turn. If appropriate and/or requested, the software can provide visual and/or audio warnings and/or tips to the traveler, such as "slow down!", "turn approaching in 200 feet", and/or "oops, you missed it, turn around", etc.

In certain exemplary embodiments, a subscriber and/or a traveler can specify a destination and/or origin for a route by typing one or more addresses and/or by clicking on and/or touching a rendered map. The subscriber and/or traveler can specify a path and/or turns along the route by typing, clicking, and/or via dragging a pointer and/or finger across the map. Thus, the subscriber and/or traveler can essentially "trace" and/or otherwise specify the desired route on the rendered map to indicate the desired destination, approach direction, path, turns, and/or origin for the particular route. The map can be linked to GPS information, such that relatively precise location information, comprising longitude, latitude, and/or azimuth, etc., information can be gathered and/or associated with the desired destination, approach direction, path, turns, and/or origin for the particular route. As a subscriber and/or traveler traces and/or otherwise specifies a desired route, thumbnail videos, photographs, and/or other associated with the route's origin, approach direction, path, turns, and/or destination can be interactively rendered to the subscriber and/or traveler, such as in a sequential order for a traveler.

Alternatively, given at least a subscriber's and/or traveler's desired destination, the software can propose origins, approaches, paths, turns, and/or accompanying videos and photos, factual information, and/or annotations, etc. Thus, for example, given a destination address and/or an origin address, the software can automatically generate a visual travel guide, route, video clip, photographs, etc.

As mentioned earlier, the server can host software that allows a subscriber to upload content, such as videos, photos, factual information, annotations, advertisements, tags (e.g., classifying labels, keywords, markups, embedded codes, markup language elements, HTML elements, SGML elements, XML elements, RSS tags, bookmarks (e.g., flicker and/or del.icio.us bookmarks and/or tags), etc.), links, etc., associated with a given visual travel guide, destination, approach direction, path, turn, origin, route, and/or vicinity thereof, etc., for others to obtain, lease, license, and/or purchase, etc. The provider can access, use, receive, store, relationally associate, link to, tag, create, assemble, provide, feed, stream, buy, sell, lease, license in, license out, and/or manage content. The provider can provide and/or specify standard and/or customized terms, such as terms of use, license fees, royalties, and/or other compensation, payment methods, ownership, assignment, and/or transfer of rights, copyright permissions, restrictions, limitations, warranties, disclaimers, indemnifications, dispute resolution, controlling law, termination, and/or severability, etc., for subscribers and/or others to provide, store, relationally associate, link to, tag, create, assemble, stream, manage, access, and/or use content. Thus, the provider can serve as a content exchange, repository, assembly tool, and/or provider, etc.

For example, license fees and/or royalties can be based, for example, on the number of visual travel guides in which a specific photo and/or video is used, the period of time over which particular content is used, the number of times certain content is accessed for a given route, advertisements rendered, click-throughs for advertisements, etc. Thus, for example, a subscriber who provides annotated photographs of a busy intersection, which happens to be popular with subscribers who are creating routes, might receive substantial licensing revenues due to a high volume of access of those photographs/videos by travelers who access such routes. A royalty, on the other hand, might have to be paid for each insertion in a guide, access by a traveler of a guide, etc. Ownership rights and/or copyrights to the provided content can be retained by the subscriber and/or transferred to the host. As another example, an advertiser might pay a larger advertising fee for an ad that accompanies one or more photographs/videos of a highly popular intersection. Fees can be paid by subscribers, travelers, and/or advertisers, etc. Content can be stored, indexed, and/or referenced from the host's database(s). In certain exemplary embodiments, rather than uploading content to be stored on the host's memory device, a subscriber can store the content on the subscriber's memory device and/or some other memory device, and simply provide a link to that content. Such a link can be stored in the provider's database(s).

In certain exemplary embodiments, a provider/subscriber/traveler can access mapping features and/or functions, such as those provided by a Geographical Information System (GIS), in conjunction with overhead transparencies (available for print out from the Internet). The subscriber and/or traveler can come to a site and indicate that an overlay for a map is desired, the grid scale of the map, and the destination. The subscriber and/or traveler can print out and place the transparency over his/her map.

Figure 11:
FIG. 11 is an exemplary output produced via an exemplary embodiment of any of the methods of FIG. 1, FIG. 10, and/or FIG. 21.
Figure 12:
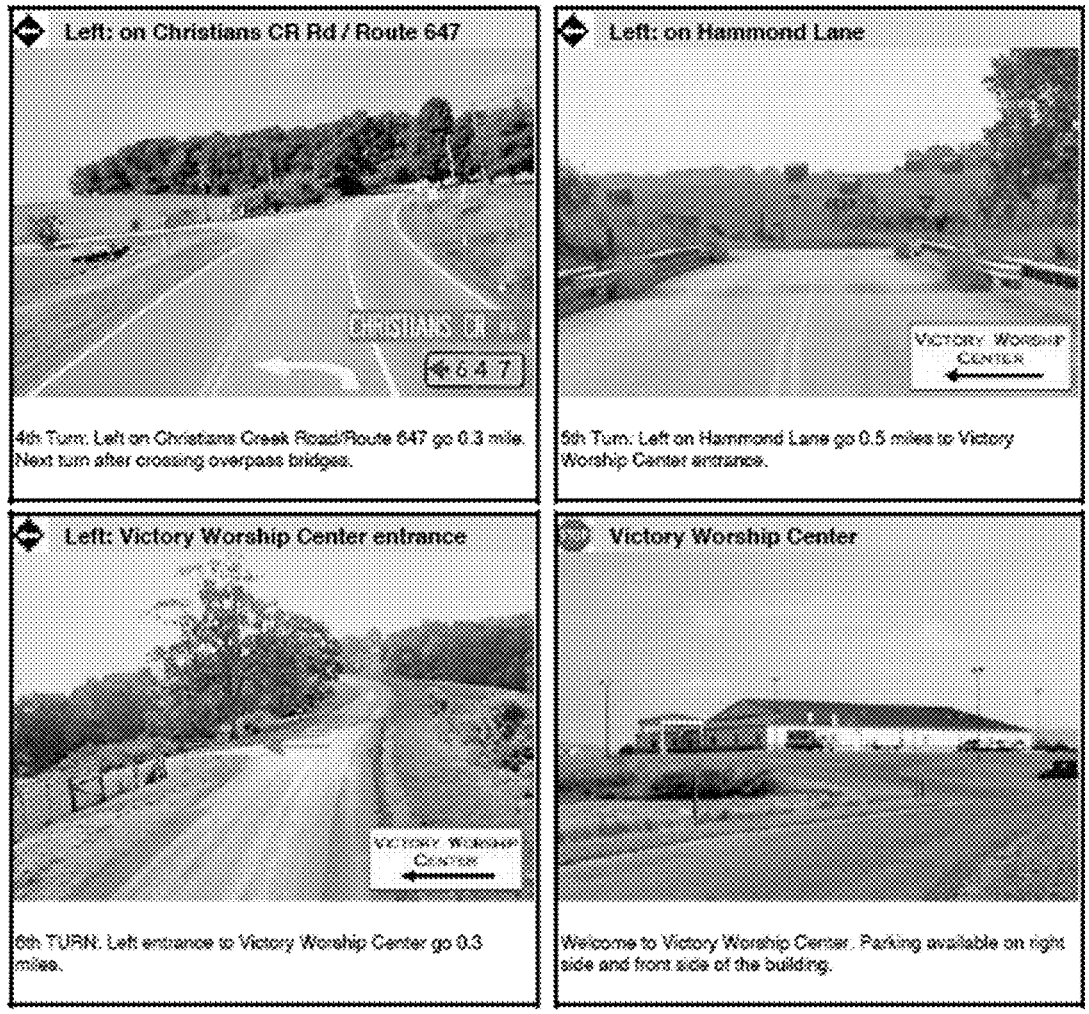
FIGS. 12A and 12B are an exemplary output produced via an exemplary embodiment of any of the methods of FIG. 1, FIG. 10, and/or FIG. 21.

In certain exemplary embodiments, a subscriber and/or traveler can request the display of a map showing a route from the origin to the destination, the map including a visual travel guide display of turns. Generally, any map can include icons, arrows, directions, routes, addresses, business names, GPS readings, etc. See FIGS. 11 and 12A-12B.

Figure 13:
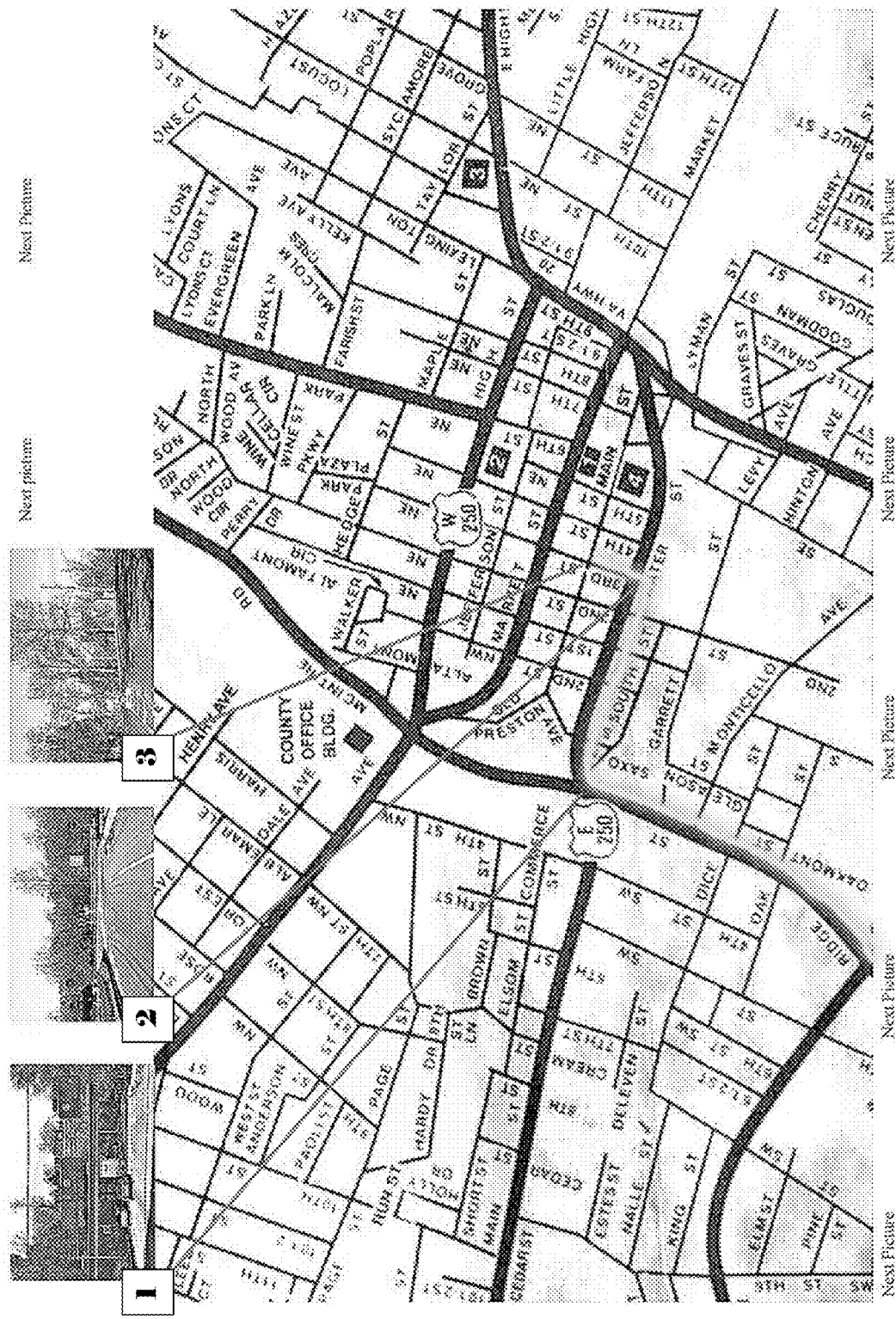
FIG. 13 is an exemplary output produced via an exemplary embodiment of any of the methods of FIG. 1, FIG. 10, and/or FIG. 21.
Figure 14:
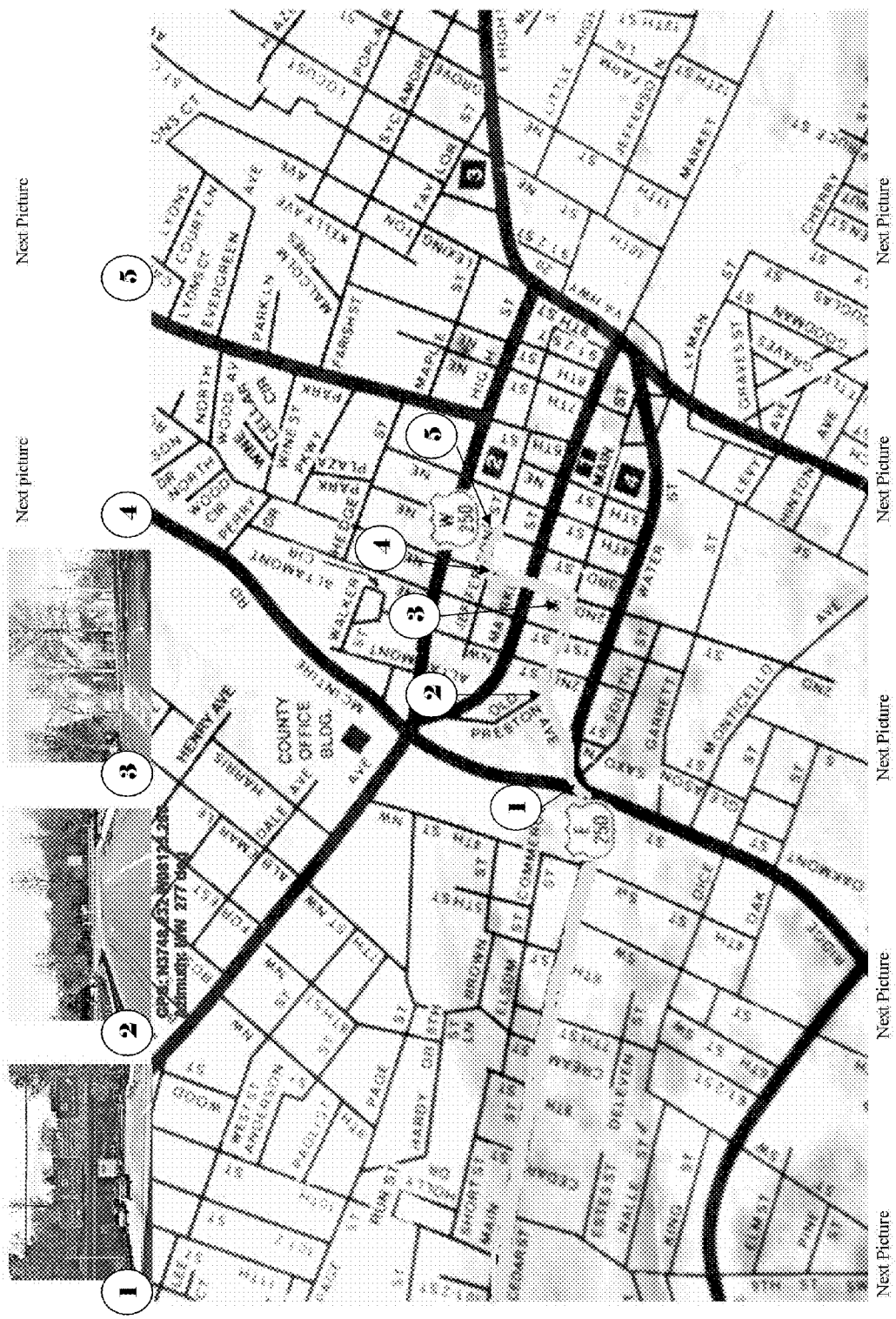
FIG. 14 is an exemplary output produced via an exemplary embodiment of any of the methods of FIG. 1, FIG. 10, and/or FIG. 21.
Figure 15:
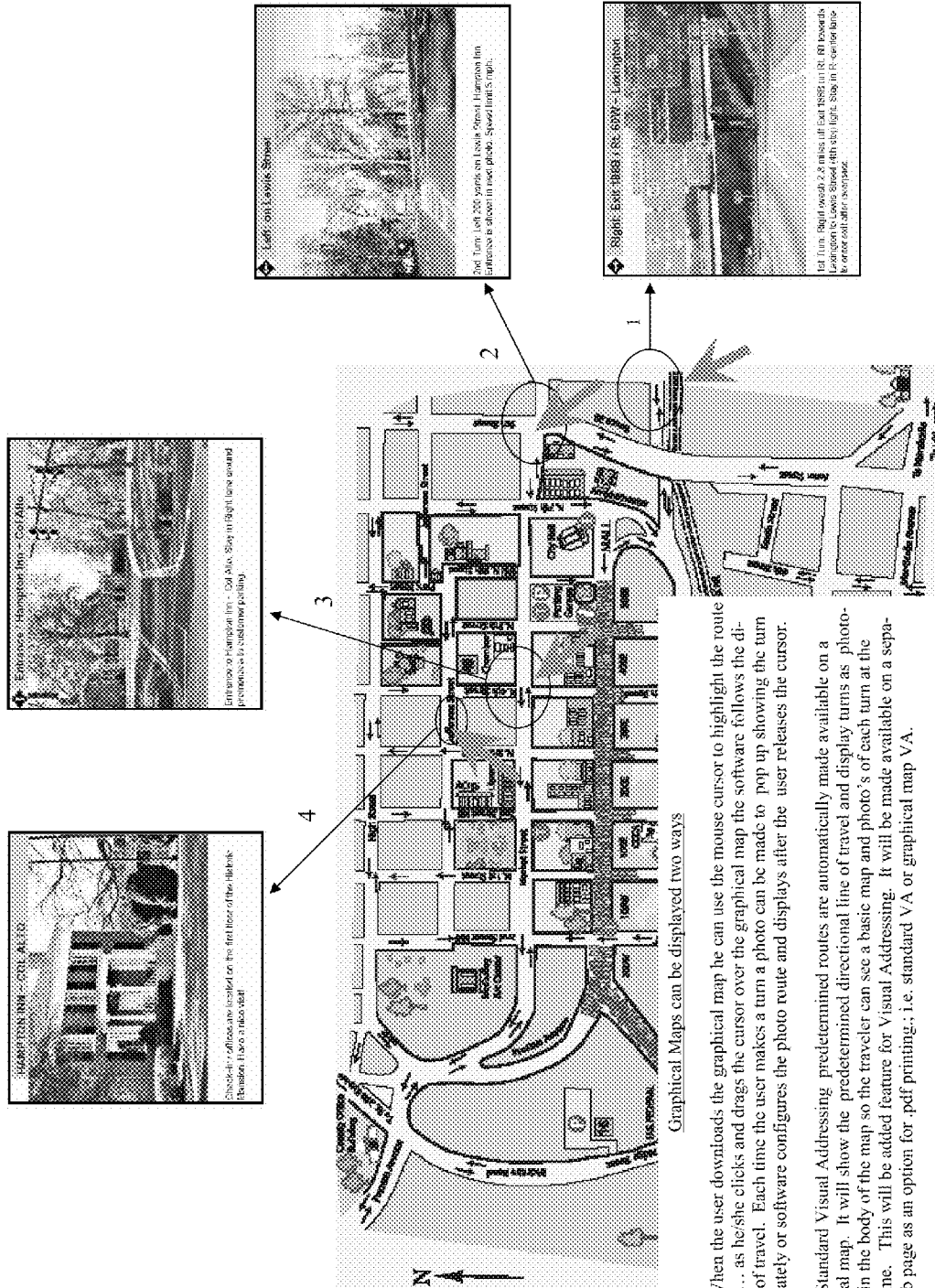
FIG. 15 is an exemplary output produced via an exemplary embodiment of any of the methods of FIG. 1, FIG. 10, and/or FIG. 21.

In certain exemplary embodiments, a subscriber and/or traveler can be provided with a path and/or route to a destination that is highlighted from start to finish showing coded frames (photos of turns) in sequence as 1, 2, 3 . . . and/or $1^{st}$, $2^{nd}$, $3^{rd}$ either with pictures alone and/or to include GPS readings, etc. as needed. See FIGS. 13-15.

Figure 16:
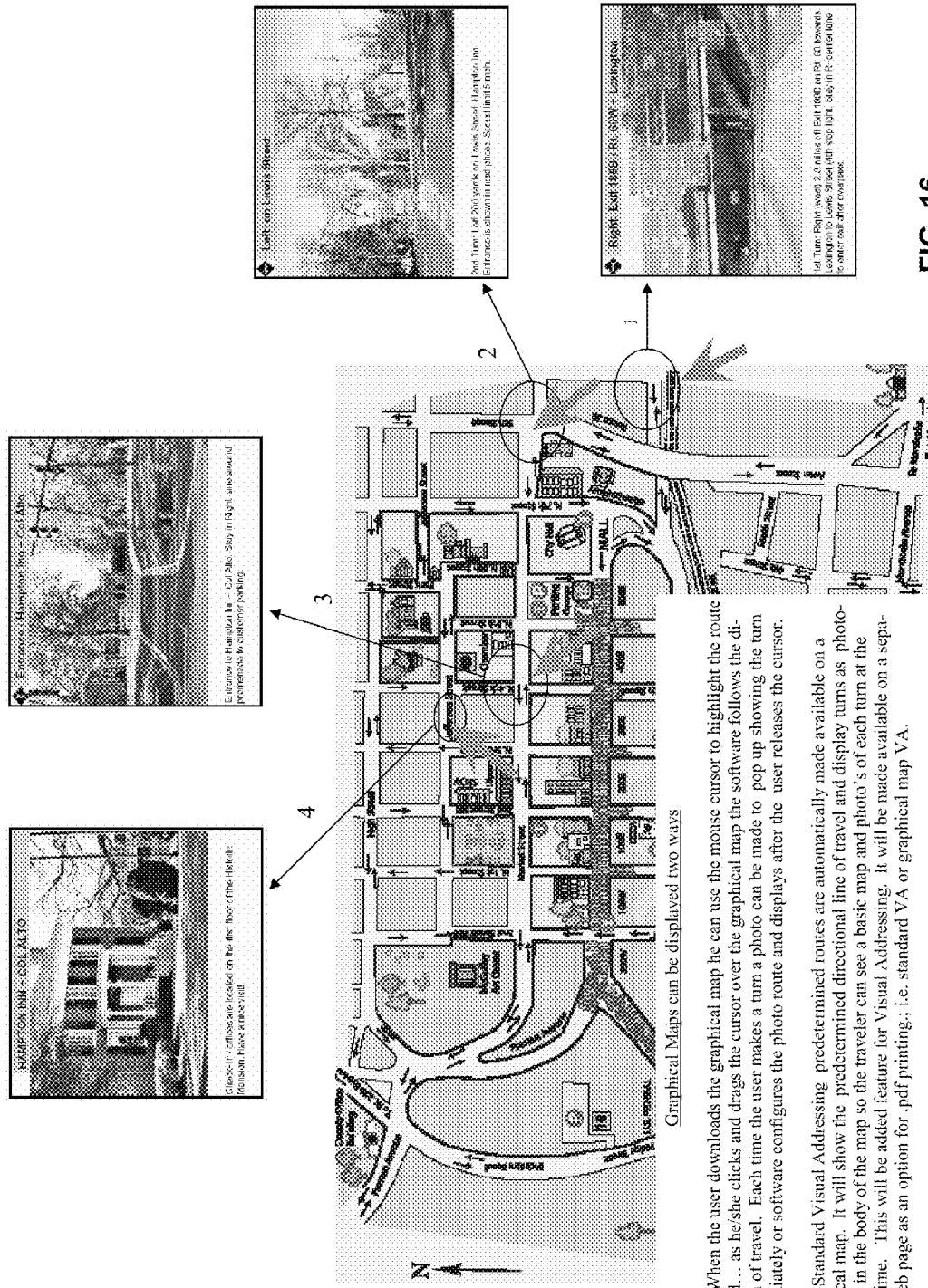
FIG. 16 is an exemplary output produced via an exemplary embodiment of any of the methods of FIG. 1, FIG. 10, and/or FIG. 21.
Figure 18:
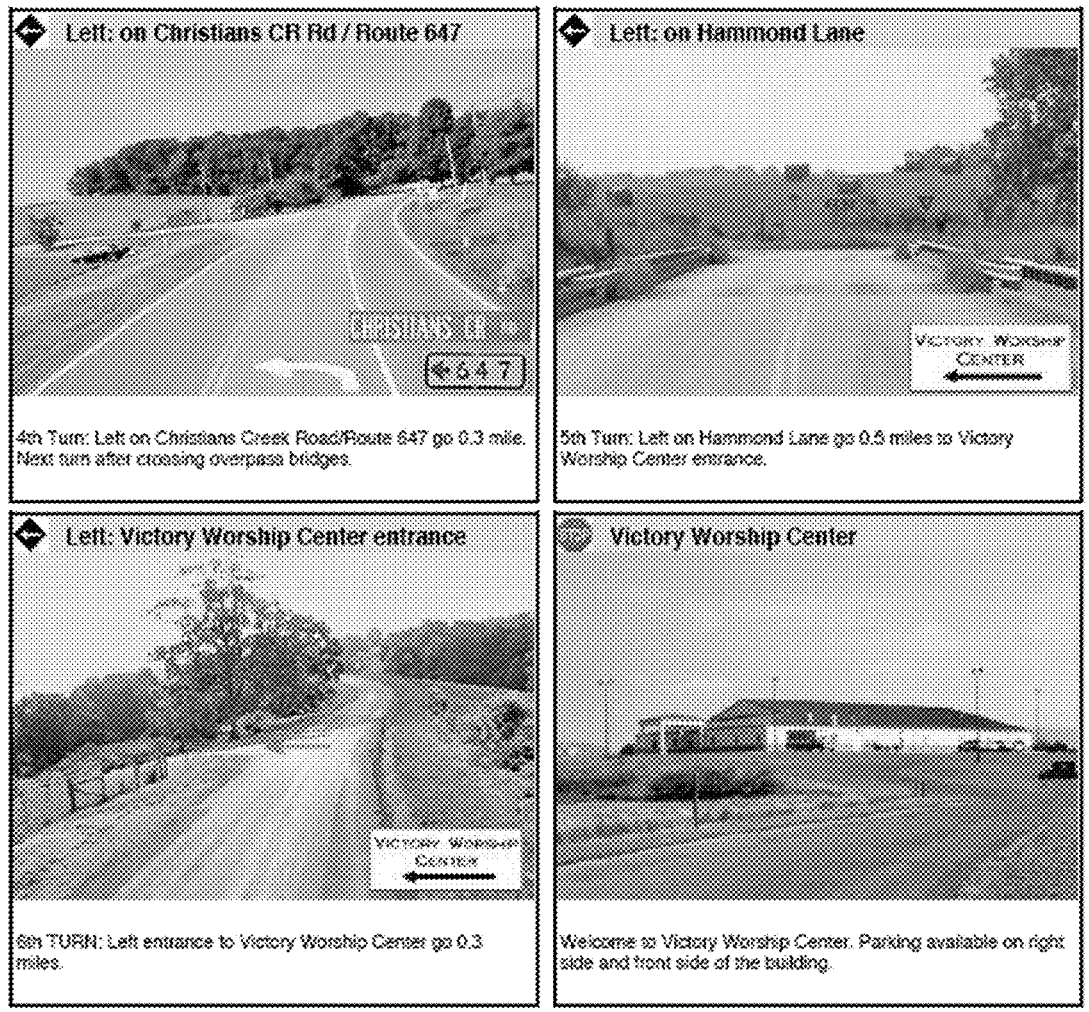
FIGS. 18A and 18B are an exemplary output produced via an exemplary embodiment of any of the methods of FIG. 1, FIG. 10, and/or FIG. 21.

In certain exemplary embodiments, an end user (via internet and/or other device) and/or a traveler (via vehicle device) can download/view a graphical map of the area designated for travel and/or being traveled and interact with that map by using his mouse/and/or other to click and drag and/or highlight a specified route to be traversed. The software follows the direction of travel indicated by the mouse or/other, annotates turns, correlates information and then simultaneously shows the map and all photos and/or videos and information associated with the route selection (see FIG. 16) and/or the user can select to have the route available for download in sequential PDF format hardcopy as a photo guide and/or in formatted video-stream copy, either way displays visuals of each turn associated with the route. See FIGS. 18A-18B.

Figure 17:
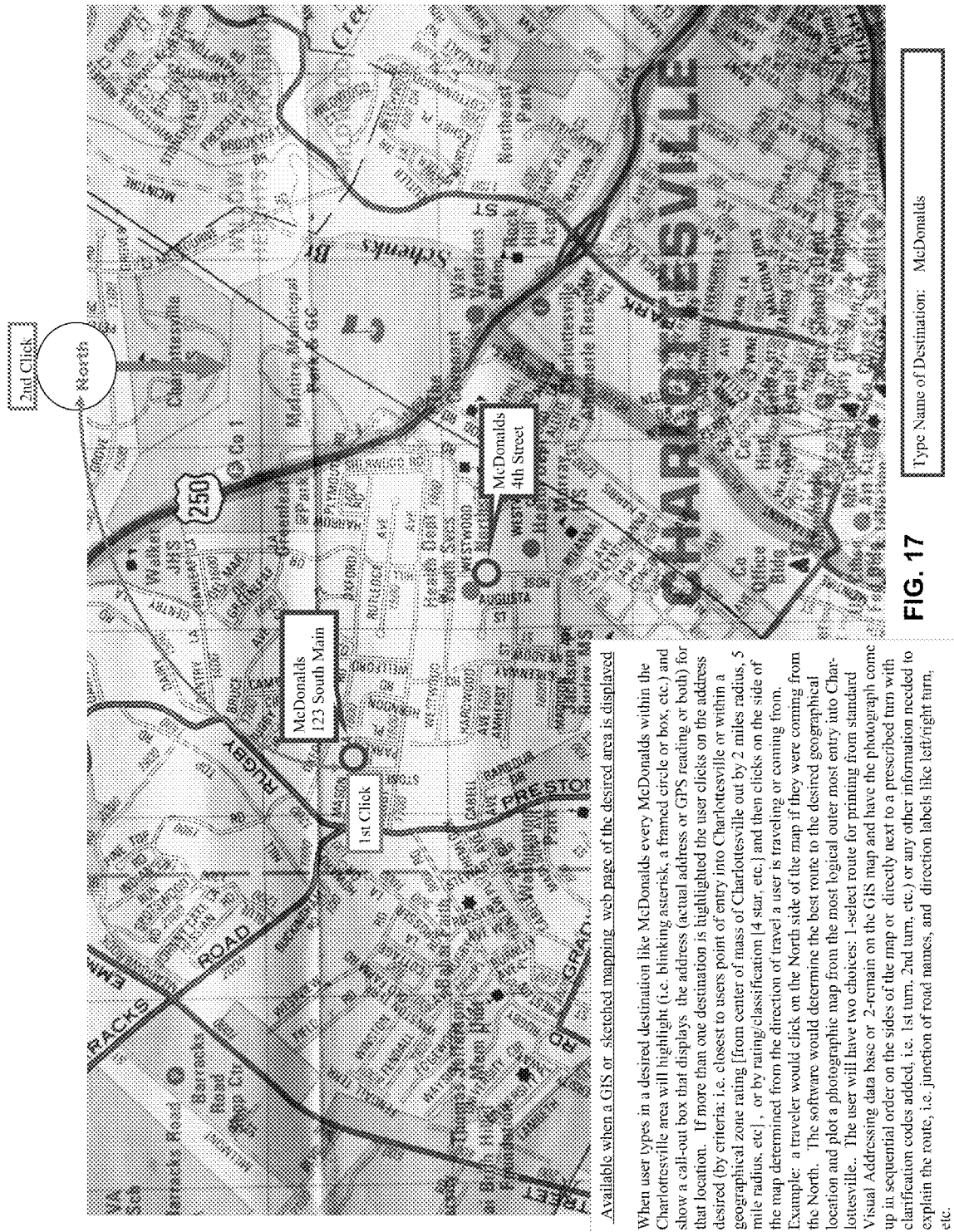
FIG. 17 is an exemplary output produced via an exemplary embodiment of any of the methods of FIG. 1, FIG. 10, and/or FIG. 21.

In certain exemplary embodiments, a traveler can enter a destination name and the system can show the selected name as an icon on a map. For example, when a traveler types in a desired destination like McDonalds and the traveler has selected Charlottesville, Va., every McDonalds within the Charlottesville area will highlight (e.g., blinking asterisk, a framed circle and/or box, etc.) and show a call-out box that displays the address (actual address and/or GPS reading and/or both) for that location. If more than one destination is highlighted, the traveler can click on the address desired (by criteria: e.g., closest to traveler's point of entry into Charlottesville and/or within a geographical zone rating (e.g., from center of mass of Charlottesville out by 2 miles radius, 5 mile radius, etc.), and/or by rating/classification (4 star, etc.)) and then can click on a side of the map, that side indicating the direction of travel from which the traveler is traveling. Example: a traveler could click on the North side of the map if they were coming from the North. The software could determine the best route to the desired geographical location and plot a visual travel guide map from the most logical outer-most entry into Charlottesville. The traveler can be provided with, for example, two choices: 1-select route for printing from standard host site data base and/or 2-remain on the GIS map and have the videos and/or photographs rendered in sequential order on the sides of the map and/or directly next to a prescribed turn with clarification codes added (e.g., $1^{st}$ turn, $2^{nd}$ turn, etc.) and/or any other information needed to explain the route, e.g., junction of road names, and direction labels like left/right turn, etc. See FIG. 17.

In certain exemplary embodiments, comparing input from a GPS receiver and/or transceiver with a predetermined route, a traveler can be provided with an "approaching turn" alarm and/or notification. The alarm/notification can be provided via hardware such as a PDA, vehicle-integral screen, cell phone, navigation system, GPS device, iPod, etc. The alarm/notification can be a visual, audible, tactile, and/or haptic, etc. Video display may be activated when GPS locks present location to preview upcoming turns and road conditions to a desired destination.

Certain exemplary embodiments can provide a Visual Travel Guide Map Display (Photo Map Display and/or Enhanced GIS Map Display), which can allow simultaneous viewing of a GIS graphical map (printed and/or made available for interactive viewing via an Internet and/or other network connection) showing photographs of each turn and/or videos of routes to guide travelers. The ability to preview a graphical map and photos/video at the same time is a more advanced means of providing directions on how to find a desired destination because it can allow the traveler to correlate photos/videos associated with a static map, i.e. turns, roads, destinations, landmarks, etc. This is where a GPS reading can be displayed as a photograph and/or video while viewing a graphic map at the same time.

Route Planning Phase

In certain exemplary embodiments, a provider and/or a subscriber can gather information concerning a desired route, e.g.:

destination, e.g., 123 East Main; Museum of Frontier Culture; Staunton; etc. origin; e.g., 456 West Main; Exit 245 off I-81 North/South; Westbound on 1-64; Monticello; Charlottesville; etc. a route to first destination (A) as above, then sequential turns for the most advantageous and/or fastest path;

approach direction to desired destination and/or turn, e.g., from North, South, West-Southwest, etc., and/or while traveling a predetermined road in a particular direction, e.g., Northbound US 29, Southbound I-81, Outer Loop of I-495, etc.

Provider/Subscriber Action Phase

In certain exemplary embodiments, a host/subscriber can video and/or photograph route turns, video and/or photograph landmarks, and/or other data information concerning the route. Note: Internet host can provide subscriber with a city (or other) data base of intersection videos and/or photos for their selection. Route turns can be sequentially displayed from predetermined origin to destination.

In certain exemplary embodiments, a provider and/or a subscriber can gather route information; e.g., address of location, road names, turn road names, mileage, reference landmarks, MLS number of home, etc.

Tour Routing

In certain exemplary embodiments, for an Open House Route Tour, the provider, a host subscriber and/or a subscriber can:

build a route to first destination (A) as above, then build a route to destination (B) referencing destination (A) as the next origin.

determine an approach direction to next home from destination A and builds next route accordingly in sequential order.

Each subsequent home can become the origin for the next part of the tour. When completed, the traveler can traverse from Destination A to B to C consecutively by accessing one file containing all elements pertaining to the entire tour. Transitions from each origin can be addressed with text frame notification instructions.

Software Interaction

In certain exemplary embodiments, the provider and/or subscriber can interact with the web site as follows:

| Web Site Subscriber Actions | Web Site Software Actions |
|---|---|
| Access host web site: | Serve, transfer, and/or render host site home page and request subscriber to register as a new subscriber by entering name, address, phone number, email, and method of payment (credit card, bank card, etc). |
| Provide authorization and information sufficient to verify credit of subscriber. | Receive authorization to seek credit verification via on-line verification service such as Paynet, VeriSign, and/or other credit authority. |
| | Request and obtain verification of credit through on-line credit authority. |
| | Activate subscriber and assign activation code to subscriber. |
| | Notify subscriber of credit verification and send activation code to the subscriber via subscriber email address. |

-continued

| Web Site Subscriber Actions | Web Site Software Actions |
|---|---|
| Enter activation code. | Verify code and request subscriber to enter unique Subscriber Name and Password. |
| | Acknowledge new subscriber name and password and record information into host site data base. |
| | Provide Subscriber Work Page for visual travel guide creation web page and request information about subscriber. |
| Enter Subscriber Information as requested | Record subscriber information into data base. |
| | Request information concerning new location and/or tour to be visually routed. |
| Provide information as requested | Record information on the web Internet data base. |
| | Assign a Subscriber information link to the information data by recording the subscriber as a direct link to the location, tour, and route. |
| Potential embodiment for building the route, tour, and/or visual travel guide | |
| | Display Subscriber Work Page with location, tour, and/or route icon displayed in the 1st frame. |
| | Direct the subscriber to enter the 2nd Frame. |
| Click on enter 2nd Frame | Display menu with three insert options: |
| | 1.) Graphics Frame |
| | 2.) Text Frame |
| | 3.) Photograph Frame (e.g., photo with annotation) |
| | 4.) Video Frame |
| 1. If subscriber selects Graphics Frame | Display browser menu that requires the subscriber to upload a JPEG graphics file (with and/or without text) in a specified 340 × 227 pixel and 72 dpi format |
| Upload subscriber's JPEG graphic to be used as an advertisement, as a coupon, and/or as an enhancement for a route and/or tour. | Automatically number the 2nd Frame and store data |
| --- OR --- | |
| 2. If subscriber selects Text Frame | Display a drop-down text box that allows the subscriber to type text information for that frame |
| Enter text information to enhance a route and/or a tour. | Automatically number the 2nd Frame and store text data |
| | Direct subscriber to enter the 3rd Frame |
| --- OR --- | |
| 3. If subscriber selects Photograph Frame | Display a menu-driven drop-down photograph insert box with text information options |
| Upload photographs, text information, annotations, etc. | Automatically number the 2nd Frame and save photograph and text data |
| | --- OR --- |
| 3. If subscriber selects a video Frame | Display a menu-driven drop-down video insert box with text information options |
| Upload videos, text information, annotations, etc. | Automatically number the 2nd Frame and save video and text data |
| | Direct subscriber to enter the 3rd Frame |
| Consecutive frames can be completed as above till all elements of the route and/or tour are completed | |
| Choose a frame type for each consecutive Insert frame | Receive and store information data for each consecutive Insert Frame from the subscriber till all frames (according to the subscriber) are completed |
| Request preview of entire route and/or tour. | Show sequenced photographic display of all frames |
| Activate route and/or tour | Create a PDF file for specified route location and/or tour route, store data and make file available for viewing, downloading and printing from a traveler's printer. |
| Potential Subscriber Corrections/Additions once route and/or tour has been activated | |
| Enters web/provider site | Acknowledge subscriber Traveler Name and Password |
| | Opens Subscriber Work Page |
| Select route file and/or tour file from stored subscriber data list | Display requested route and/or tour on Subscriber Work Page |
| Review route and/or tour and make corrections | Automatically make changes and/or insert additions and store new information as subscriber enters |

| Web Site Subscriber Actions | Web Site Software Actions |
|---|---|
| and/or insert additions where needed. | information |
| | Instruct subscriber to reactivate route and/or tour when corrections and/or additions are made. |
| Activate corrected route and/or tour | Create a new PDF file of route, tour, and/or photographic guide upon re-activation |

Figure 19:
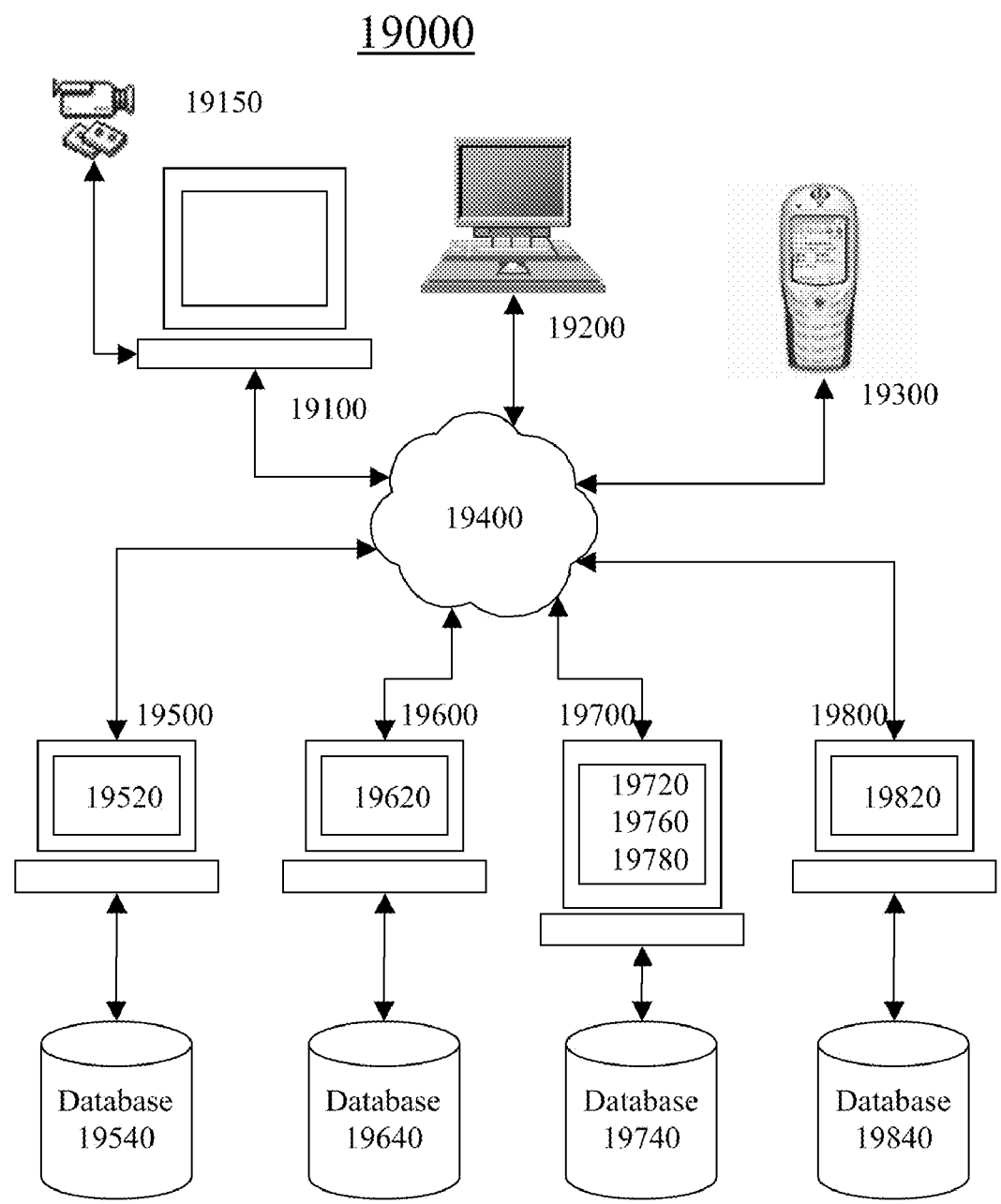
FIG. 19 is a block diagram of an exemplary embodiment of a system 19000.

FIG. 19 is a block diagram of an exemplary embodiment of a system 19000, which can comprise any number of user information devices 19100, 19200, 19300, via which content, such as photos, videos, audios, graphics, images, etc., and/or commands and/or instructions, etc., can be uploaded, transferred, provided, requested, and/or received, via network 19400, to and/or from any number of servers 19500, 19600, 19700, and/or 19800, any of which can be coupled to a respective database 19540, 19640, 19740, and/or 19840, such as via a respective database manager, 19520, 19620, 19720, and/or 19820. For example, visual content, such as photos and/or videos, such as those adapted to substantially reproduce a view of driver of an automobile approaching a road intersection of, along, and/or on a predetermined route, can be captured via one or more information recording devices 19150, such as a recording device attached to the automobile (even if indirectly attached to the automobile by virtue of being held by an occupant of the automobile), and transferred to user information device 19100, where the information contained therein can be digitized, sampled, stored, edited, revised, enhanced, encoded, encrypted, and/or otherwise processed. From information device 19100, the original and/or processed information can be transferred to content server 19500. Commands for creating a visual travel guide using that content, other content, and/or any content can be entered via any user interface of any user information device. From those commands, machine instructions for creating one or more visual travel guides can be generated on, transmitted via an encoding signal from and/or to, and/or implemented on, any user information device and/or any server, such as via guide creation program 19760 running on server 19700. The created visual travel guide can include the desired content (e.g., photographic, videographic, audio, textual, and/or graphical (e.g., maps, sketches, animations, etc.) representations, descriptions, simulations, annotations, and/or identifications of one or more origins, intersections, turns, waypoints, landmarks, excursions, approaches, roads, directions, and/or destinations, etc., and/or metadata, tags, factual information, terms, and/or promotional items potentially associated therewith, etc.), user interface elements and/or controls (e.g., buttons, menus, links, dialogs, and/or check boxes, etc.), and/or machine instructions for accessing, distributing, tracking, streaming, storing, extracting, searching, arranging, structuring, formatting, rendering, printing, modifying, tagging, subscribing to, accounting for, billing for, managing, and/or otherwise processing and/or utilizing any of the foregoing. Upon a request, such as from user information device 19300, server software, such as server software 19780, can transmit a signal encoding the visual travel guide and/or any portion thereof from, for example, server 19700, to user information device 19300 where the visual travel guide and/or any portion thereof can be rendered according to the machine instructions for rendering.

Figure 20:
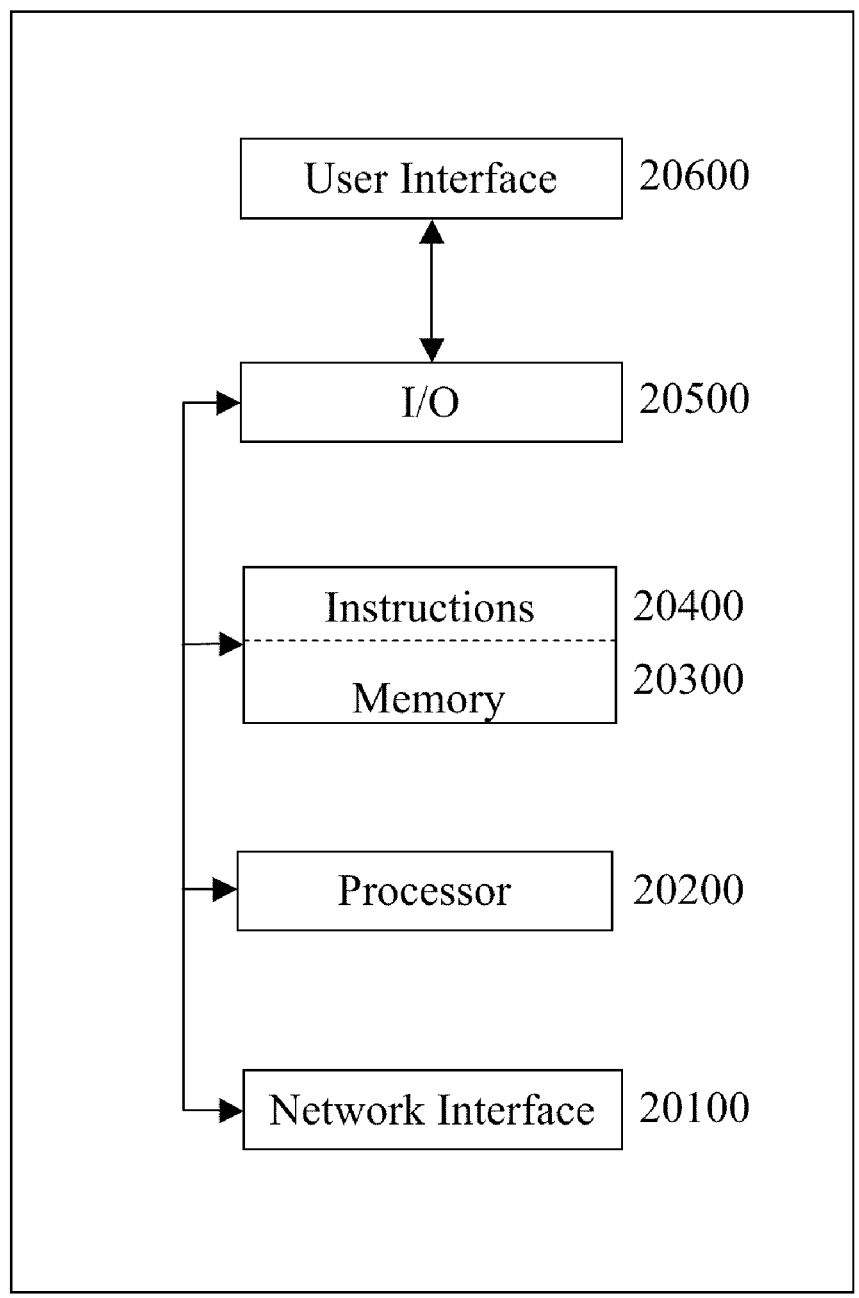
FIG. 20 is a block diagram of an exemplary embodiment of an information device 20000.

FIG. 20 is a block diagram of an exemplary embodiment of an information device 20000, which in certain operative embodiments can comprise, for example, any user information device 19100, 19200, 19300, and/or any server 19500, 19600, 19700, 19800, etc., of FIG. 19. Information device 20000 can comprise any of numerous components, such as for example, one or more network interfaces 20100, one or more processors 20200, one or more memories 20300 containing instructions 20400, one or more input/output (I/O) devices 20500, and/or one or more user interfaces 20600 coupled to I/O device 20500, etc.

In certain exemplary embodiments, via one or more user interfaces 20600, such as a graphical user interface, a user can view a rendering of information, such as content, commands, and/or a visual travel guide, related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Figure 21:
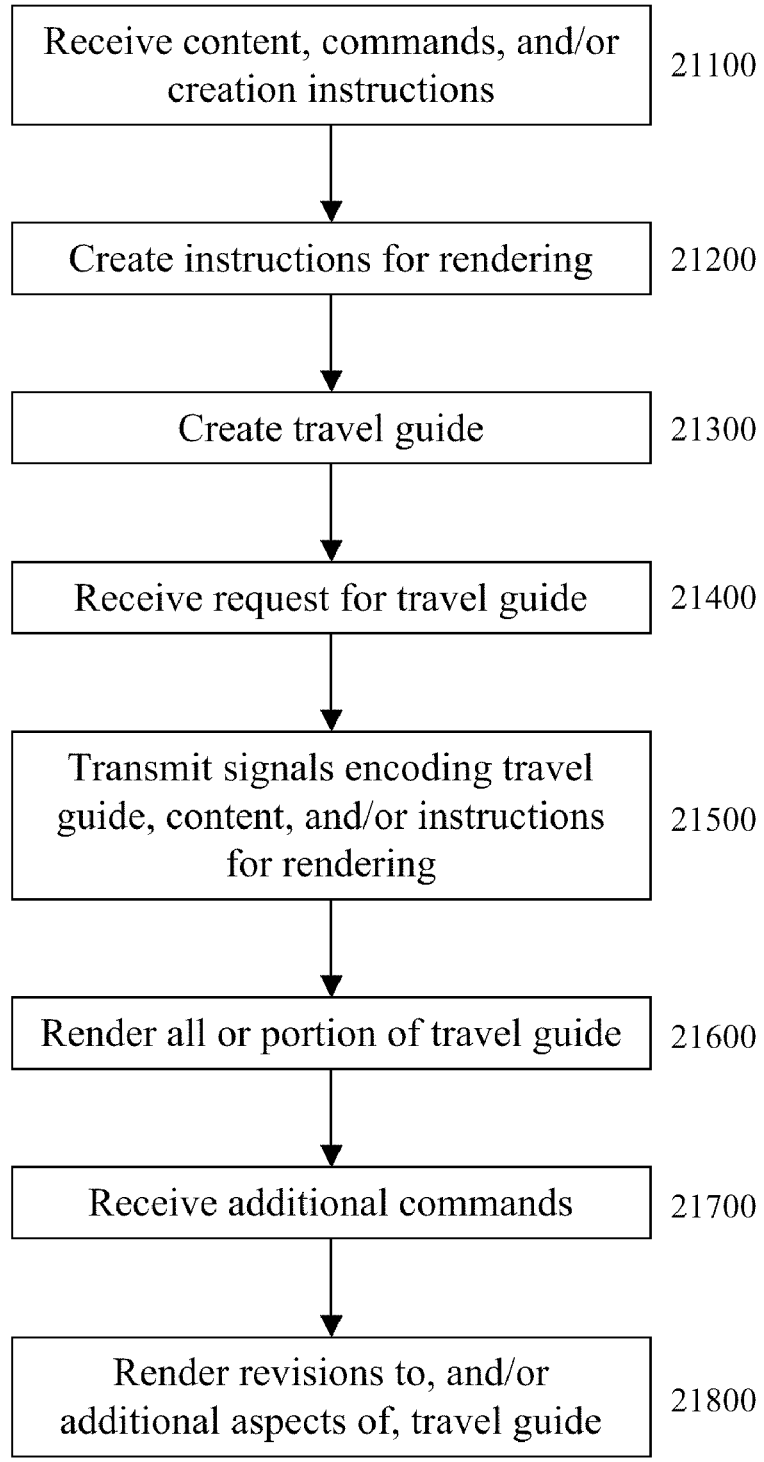
FIG. 21 is a flowchart of an exemplary embodiment of a method 21000.

FIG. 21 is a flowchart of an exemplary embodiment of a method 21000. At activity 21100, content, commands, and/or creation instructions can be received. At activity 21200, machine instructions for rendering a visual travel guide, content thereof, and/or controls therefore, can be created. At activity 21300, a visual travel guide can be created, which can include the machine instructions of activity 21200 for rendering the content and/or controls of that visual travel guide. At activity 21400, a request can be received requesting the provision of a visual travel guide. At activity 21500, a visual travel guide, content thereof, controls therefore, and/or machine instructions for rendering any of the foregoing can be transmitted via encoding signals. At activity 21600, any portion of a travel guide can be rendered, such as according to the machine instructions for rendering the content and/or controls of that visual travel guide. At activity 21700, a user of a visual travel guide can provide commands requesting additional information, other portions of the visual travel guide, and/or describing modifications to the visual travel guide, etc. At activity 21800, revisions to, additional aspects of, and/or information external to, the visual travel guide can be rendered.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

activity—an action, act, deed, function, step, and/or process and/or a portion thereof.

activity—an action, act, step, and/or process or portion thereof.

adapted to—suitable, fit, and/or capable of performing a specified function.

advertisement—a notice, such as a paid announcement, designed to attract public attention and/or patronage.

approach—v. to advance upon, come near, and/or come nearer to; n. the act of drawing near; an identified roadway and/or compass direction.

arrangement—a temporal and/or spatial ordering of things.

associated with—related to.

at least—not less than.

attach—to fasten, secure, couple, and/or join.

automatically—acting and/or operating in a manner essentially independent of external human influence and/or control. For example, an automatic light switch can turn on upon "seeing" a person in its view, without the person manually operating the light switch.

automobile—a passenger vehicle adapted to, during normal operations, travel on ordinary roads.

based—being derived from.

can—is capable of, in at least some embodiments.

capture—to record information in a retrievable form.

cause—to bring about, provoke, precipitate, produce, elicit, be the reason for, result in, and/or effect.

command—a signal that initiates an operation defined by an instruction.

comprising—including but not limited to, what follows.

content—data and/or meta-data, such as a photograph, factual information, annotation, tag, etc., regarding a destination, approach direction, path, turn, origin, route, and/or vicinity thereof, and/or a photograph, factual information, annotation, etc., thereof.

corresponding—related, associated, accompanying, similar in purpose and/or position, conforming in every respect, and/or equivalent and/or agreeing in amount, quantity, magnitude, quality, and/or degree.

create—to make, form, produce, generate, bring into being, and/or cause to exist.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

description—a representation of one or more characteristics.

destination—a place, address, and/or entity to which a movement, shipment, and/or voyage is ultimately directed.

device—an instrumentality adapted to a particular purpose.

driver—one who steers and controls an automobile while it is traveling on a road.

each—every one of a group considered individually.

further—in addition.

guide—v. to direct, steer, and/or exert control and/or influence over; n. a book, pamphlet, file, and/or collection, etc., giving information, instructions, and/or advice.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

host—a provider of a service and/or a server or other computer system adapted to provide such service.

identification—evidence of identity, such as a moniker, description, designation, and/or characteristics, and/or something that uniquely and/or substantially uniquely identifies a person and/or thing.

image—an at least two-dimensional representation of an entity and/or phenomenon.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC and/or other integrated circuit, a hardware electronic logic circuit such as a discrete element circuit, and/or a programmable logic device such as a PLD, PLA, FPGA, or PAL, or the like, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached and/or connected.

intersection—a point and/or line defined by the meeting of two or more items.

landmark—a prominent and/or conspicuous building, feature, and/or object on land that serves as a guide, especially to travelers on a road; and/or a distinguishing landscape feature marking a site and/or location.

located—situated approximately in a particular spot and/or position.

machine—a device and/or system adapted to perform at least one task.

machine instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—one or more physical structures from which a machine can obtain data and/or information. Examples include one or more memories, memory devices, punch cards, bar codes, etc.

map—a representation, usually on a plane surface, of a region of the earth.

may—is allowed to, in at least some embodiments.

method—a process, procedure, and/or collection of related activities for accomplishing something.

modify—to change, cause to change, edit, alter, replace, delete, and/or correct.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any device, system, and/or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

origin—a place, address, and/or location from which a movement, shipment, and/or voyage begins.

packet—a discrete instance of communication.

plurality—the state of being plural and/or more than one.

portion—a part, component, section, percentage, ratio, and/or quantity that is less than a larger whole. Can be visually, physically, and/or virtually distinguishable and/or non-distinguishable.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

promotional item—something devised to publicize and/or encourage the sale and/or acceptance of a product, cause, institution, etc., such as a coupon, business card, logo, trademark, notice, announcement, press release, brochure, free sample, poster, commercial, and/or advertisement, etc.

provide—to furnish, supply, give, convey, send, and/or make available.

receive—to obtain, get, take, and/or acquire.

record—to gather, capture, and/or preserve information.

render—to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc.

representation—an approximation, equivalent, mathematical characterization, rendering, image, and/or likeness of something.

reproduce—to copy, imitate, and/or represent.

request—(v.) to express a need and/or desire for; to inquire and/or ask for. (n.) that which communicates an expression of desire and/or that which is asked for.

road—a street, highway, and/or long, narrow stretch with a smoothed and/or paved surface, made for traveling by motor vehicle, carriage, etc., between two or more points.

route—a path along which an automobile and/or person typically travels.

set—a related plurality of predetermined elements; and/or one or more distinct items and/or entities having a specific common property or properties.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

specific—intended for, applying to, and/or acting on a particular thing.

store—to place, hold, retain, enter, and/or copy into and/or onto a machine-readable medium.

subscriber—a content provider and/or traveler.

substantially—to a considerable, large, and/or great, but not necessarily whole and/or entire, extent and/or degree.

textual—words treated as data by a computer.

transmit—to provide, furnish, supply, send as a signal, and/or to convey (e.g., force, energy, and/or information) from one place and/or thing to another.

travel—v. to go and/or move from one place to another; n. the act of traveling.

turn—to change the position of by traversing an arc.

unique—existing as the only one, having no equal, and/or distinctive in some attribute.

user—a person, organization, process, device, program, protocol, and/or system, such as a subscriber, customer, provider, server administrator, motorist, and/or traveler, etc., that uses at least a portion of a device, system, process, method, and/or service described herein.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element and/or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

video—a collection of related images adapted to be visibly, sequentially, and substantially coherently rendered via a machine, such as a video player, a DVD player, and/or an information device, etc.

view—a human perspective of a scene.

visual—visible.

wherein—in regard to which; and; and/or in addition to.

What is claimed is:

1. A method, comprising:
for a predetermined route, automatically processing a first set of machine instructions to create a visual travel guide specific to the predetermined route, the visual travel guide comprising a second set of machine instructions adapted to cause an information device to render, in a predetermined arrangement:
an identification of a destination of the predetermined route;
a plurality of videos, each video corresponding to a unique road intersection located approximately on the predetermined route, each video adapted to substantially reproduce a view of a driver of an automobile approaching the road intersection as recorded via one or more video information recording devices attached to the automobile;
a plurality of textual descriptions associated with the plurality of videos; and
at least one of an identification of an origin of the predetermined route and an identification of an approach to the destination.

2. The method of claim 1, further comprising:
automatically creating the first set of machine instructions based on user-provided commands.

3. The method of claim 1, further comprising:
automatically creating the second set of machine instructions.

4. The method of claim 1, further comprising:
automatically creating the second set of machine instructions based on user-provided commands.

5. The method of claim 1, further comprising:
automatically receiving a request for the visual travel guide.

6. The method of claim 1, further comprising:
automatically providing the visual travel guide, the provided visual travel guide automatically customized to at least one of an origin, current location, approach, route, and destination of a traveler associated with the request.

7. The method of claim 1, further comprising:
automatically transmitting the visual travel guide via a network.

8. The method of claim 1, further comprising:
automatically modifying the second set of machine instructions based on user-provided commands.

9. The method of claim 1, further comprising:
automatically generating a third set of machine instructions based on user-provided commands provided upon performance of said second set of machine instructions.

10. The method of claim 1, wherein:
the second set of machine instructions is adapted to cause the information device to render an identification of a turn located along the predetermined route.

11. The method of claim 1, wherein:
the second set of machine instructions is adapted to cause the information device to render a visual representation of a turn located along the predetermined route.

12. The method of claim 1, wherein:
the second set of machine instructions is adapted to cause the information device to render an identification of a landmark associated with at least a portion of the predetermined route.

13. The method of claim 1, wherein:
the second set of machine instructions is adapted to cause the information device to render a visual representation of a landmark associated with at least a portion of the predetermined route.

14. The method of claim 1, wherein:
the second set of machine instructions is adapted to cause the information device to render a map associated with at least a portion of the predetermined route.

15. The method of claim 1, wherein:
the second set of machine instructions is adapted to cause the information device to render a map associated with the road intersection.

16. The method of claim 1, wherein:
the second set of machine instructions is adapted to cause the information device to render a promotional item.

17. The method of claim 1, wherein:
the second set of machine instructions is adapted to cause the information device to render an advertisement associated with at least a portion of the predetermined route.

18. The method of claim 1, wherein:
an advertisement associated with at least one of an origin, current location, approach, route, and destination of a traveler associated with the request.

19. A non-transitory machine-readable medium comprising a physical structure storing first machine-implementable instructions for activities comprising:
for a predetermined route, creating a visual travel guide specific to the predetermined route, the visual travel guide comprising second machine-implementable instructions adapted to cause an information device to render, in a predetermined arrangement:
an identification of a destination of the predetermined route;
a plurality of videos, each video corresponding to a unique road intersection located approximately on the predetermined route, each video adapted to substantially reproduce a view of a driver of an automobile approaching the road intersection as recorded via one or more video information recording devices attached to the automobile;
a plurality of textual descriptions associated with the plurality of videos; and
at least one of an identification of an origin of the predetermined route and an identification of an approach to the destination.

20. A method, comprising:
for a predetermined route, automatically processing a first set of machine instructions to create a visual travel guide specific to the predetermined route, the visual travel guide comprising a second set of machine instructions adapted to cause an information device to render, in a predetermined arrangement:

an identification of a destination of the predetermined route;

a plurality of photographs, each photograph corresponding to a unique road intersection located approximately on the predetermined route, each photograph adapted to substantially reproduce a view of a driver of an automobile approaching the road intersection as recorded via one or more photographic information recording devices attached to the automobile;

a plurality of textual descriptions associated with the plurality of photographs;

at least one of an identification of an origin of the predetermined route and an identification of an approach to the destination; and an advertisement associated with at least a portion of the predetermined route.

\* \* \* \* \*